(12) United States Patent
Akiyama et al.

(10) Patent No.: US 12,009,677 B2
(45) Date of Patent: Jun. 11, 2024

(54) POWER FEED SYSTEM

(71) Applicant: MAXELL, LTD., Kyoto (JP)

(72) Inventors: Hitoshi Akiyama, Kyoto (JP); Yoshinori Okada, Kyoto (JP)

(73) Assignee: MAXELL, LTD., Kyoto (JP)

( * ) Notice: Subject to any disclaimer, the term of this patent is extended or adjusted under 35 U.S.C. 154(b) by 28 days.

(21) Appl. No.: 17/610,125

(22) PCT Filed: May 10, 2019

(86) PCT No.: PCT/JP2019/018774
§ 371 (c)(1),
(2) Date: Nov. 9, 2021

(87) PCT Pub. No.: WO2020/230194
PCT Pub. Date: Nov. 19, 2020

(65) Prior Publication Data
US 2022/0216739 A1    Jul. 7, 2022

(51) Int. Cl.
*H02J 50/90* (2016.01)
*H02J 7/00* (2006.01)
(Continued)

(52) U.S. Cl.
CPC .......... *H02J 50/90* (2016.02); *H02J 7/00034* (2020.01); *H02J 50/12* (2016.02); *H02J 50/80* (2016.02)

(58) Field of Classification Search
None
See application file for complete search history.

(56) References Cited

U.S. PATENT DOCUMENTS

| | | | |
|---|---|---|---|
| 2008/0054638 A1 | 3/2008 | Greene et al. | |
| 2012/0212068 A1 | 8/2012 | Urano | |
| 2012/0299389 A1* | 11/2012 | Lee ...................... | H04B 5/0075 307/104 |
| 2015/0188363 A1 | 7/2015 | Yamada | |

(Continued)

FOREIGN PATENT DOCUMENTS

| | | |
|---|---|---|
| JP | 2008-5573 A | 1/2008 |
| JP | 2010-503368 A | 1/2010 |

(Continued)

OTHER PUBLICATIONS

International Search Report issued in corresponding International Patent Application No. PCT/JP2019/018774, dated Jul. 2, 2019, with English translation.

*Primary Examiner* — Daniel Kessie
(74) *Attorney, Agent, or Firm* — Rimon P.C.

(57) ABSTRACT

In a power supply system for wirelessly supplying power between a power transmission device and a power reception device, the power transmission device includes a power transmission unit for generating supply power and transmitting the generated supply power to the power reception device; a power transmission side magnet for alignment with the power reception device; a magnetic sensor for detecting a magnetic force from a power reception side magnet provided in the power reception device; and a control unit for controlling the power transmission device. The power reception device includes: a power reception unit for receiving the supply power supplied from the power transmission device; the power reception side magnet for alignment with the power transmission device; and a control unit for controlling the power reception device. When the power transmission device and the power reception device are in close contact with each other, power is wirelessly transmitted from the power transmission unit to the power reception unit in a state in which the power transmission unit and the power reception unit are aligned by an attractive magnetic force between the power transmission side magnet and the power (Continued)

reception side magnet. When the power transmission device and the power reception device are apart from each other, the control unit of the power transmission device starts or stops power transmission from the power transmission unit according to a magnetic force detection signal from the power reception side magnet detected by the magnetic sensor.

9 Claims, 13 Drawing Sheets

(51) Int. Cl.
*H02J 50/12* (2016.01)
*H02J 50/80* (2016.01)

(56) References Cited

U.S. PATENT DOCUMENTS

| | | | | |
|---|---|---|---|---|
| 2015/0280483 | A1* | 10/2015 | Golko | H02J 50/90 320/108 |
| 2016/0241046 | A1* | 8/2016 | Lee | H02J 50/12 |
| 2017/0033567 | A1 | 2/2017 | Adamisin | |
| 2017/0047765 | A1 | 2/2017 | Jung et al. | |
| 2017/0294797 | A1 | 10/2017 | Meng et al. | |
| 2018/0254666 | A1* | 9/2018 | Onishi | H02J 50/90 |
| 2019/0123597 | A1* | 4/2019 | Patmore | A61G 3/0218 |

FOREIGN PATENT DOCUMENTS

| | | |
|---|---|---|
| JP | 2015-126635 A | 7/2015 |
| JP | 3210798 U | 6/2017 |
| WO | 2012/115117 A1 | 8/2012 |
| WO | 2017/176908 A1 | 10/2017 |

* cited by examiner

F I G. 1B
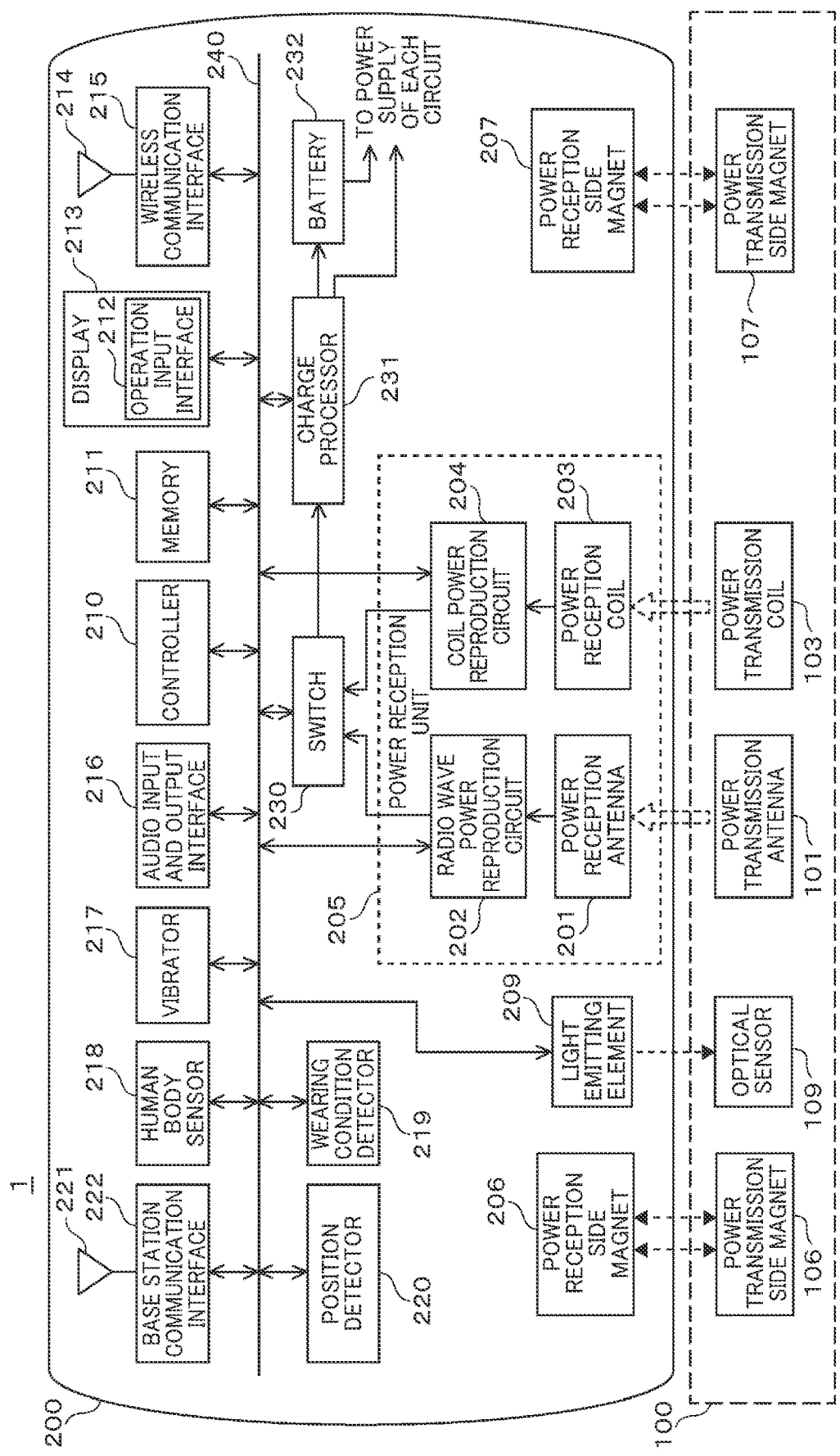

F I G. 2 A
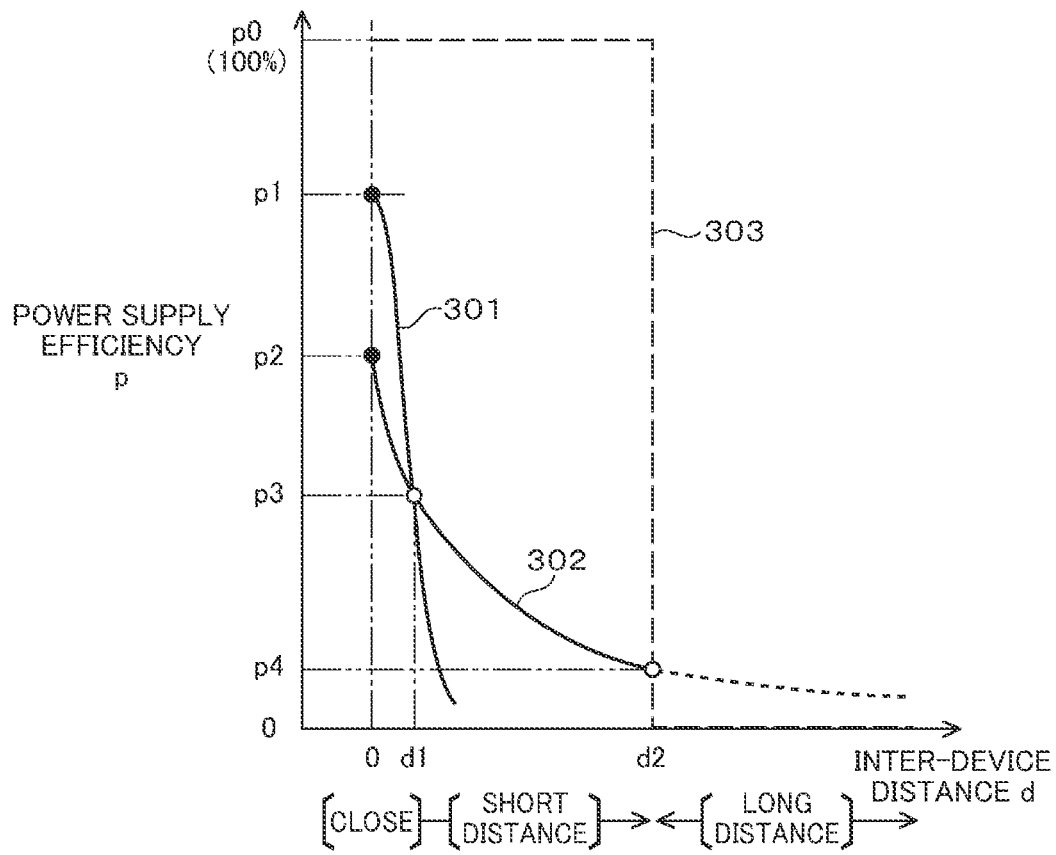
F I G. 2 B
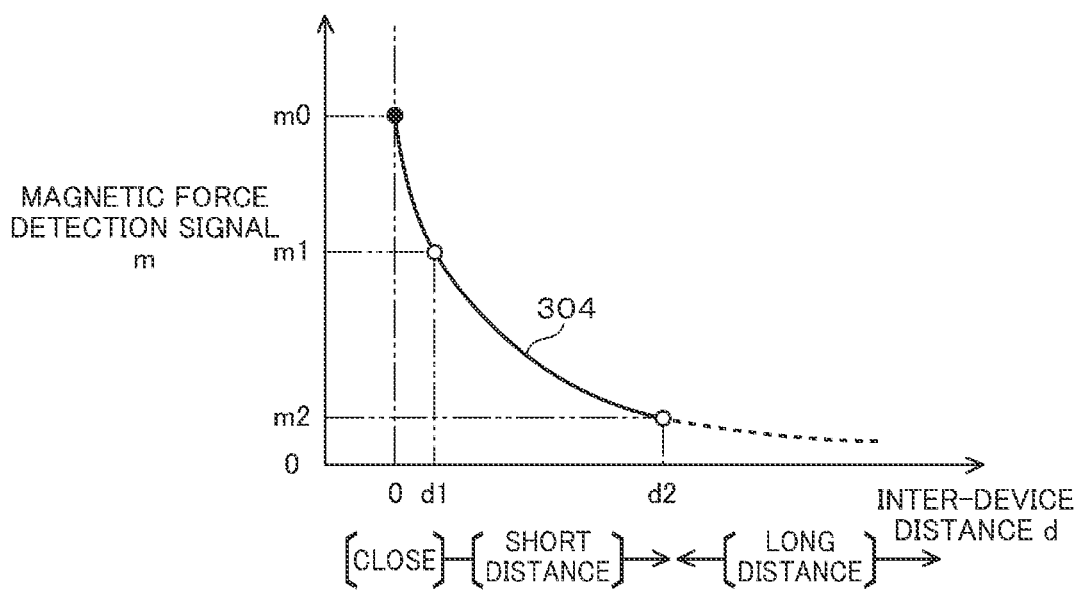

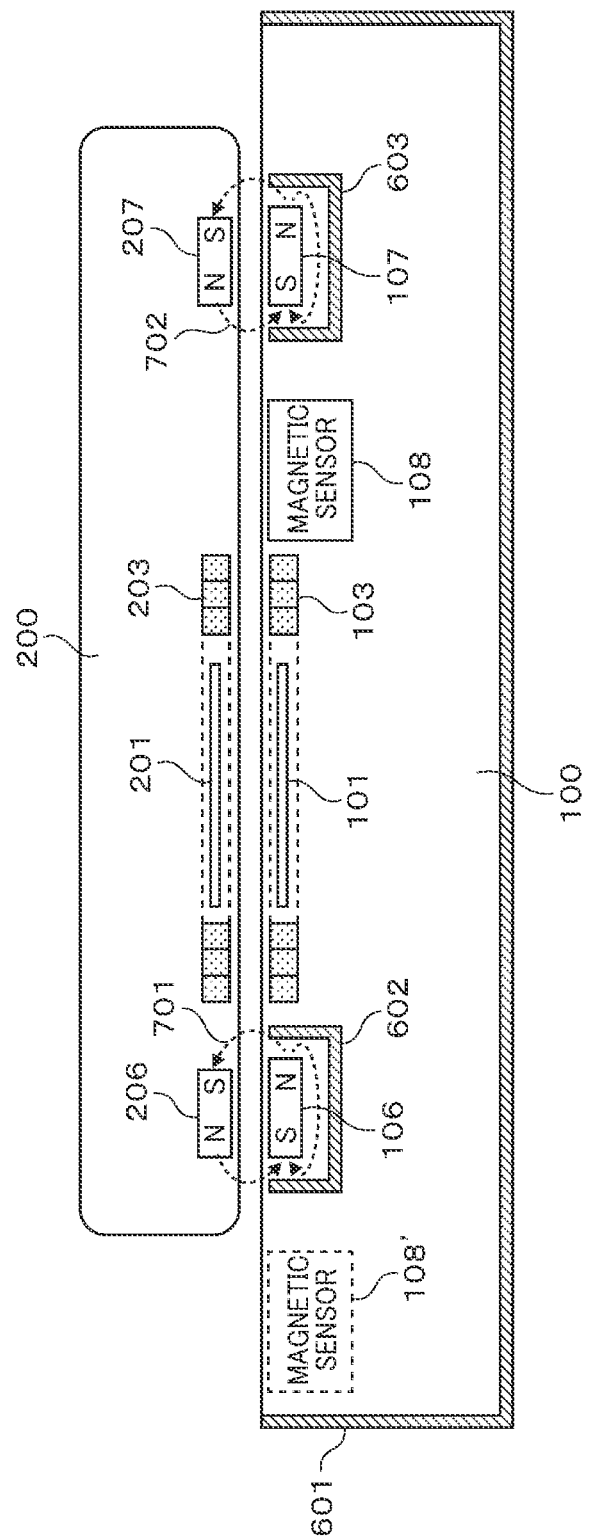

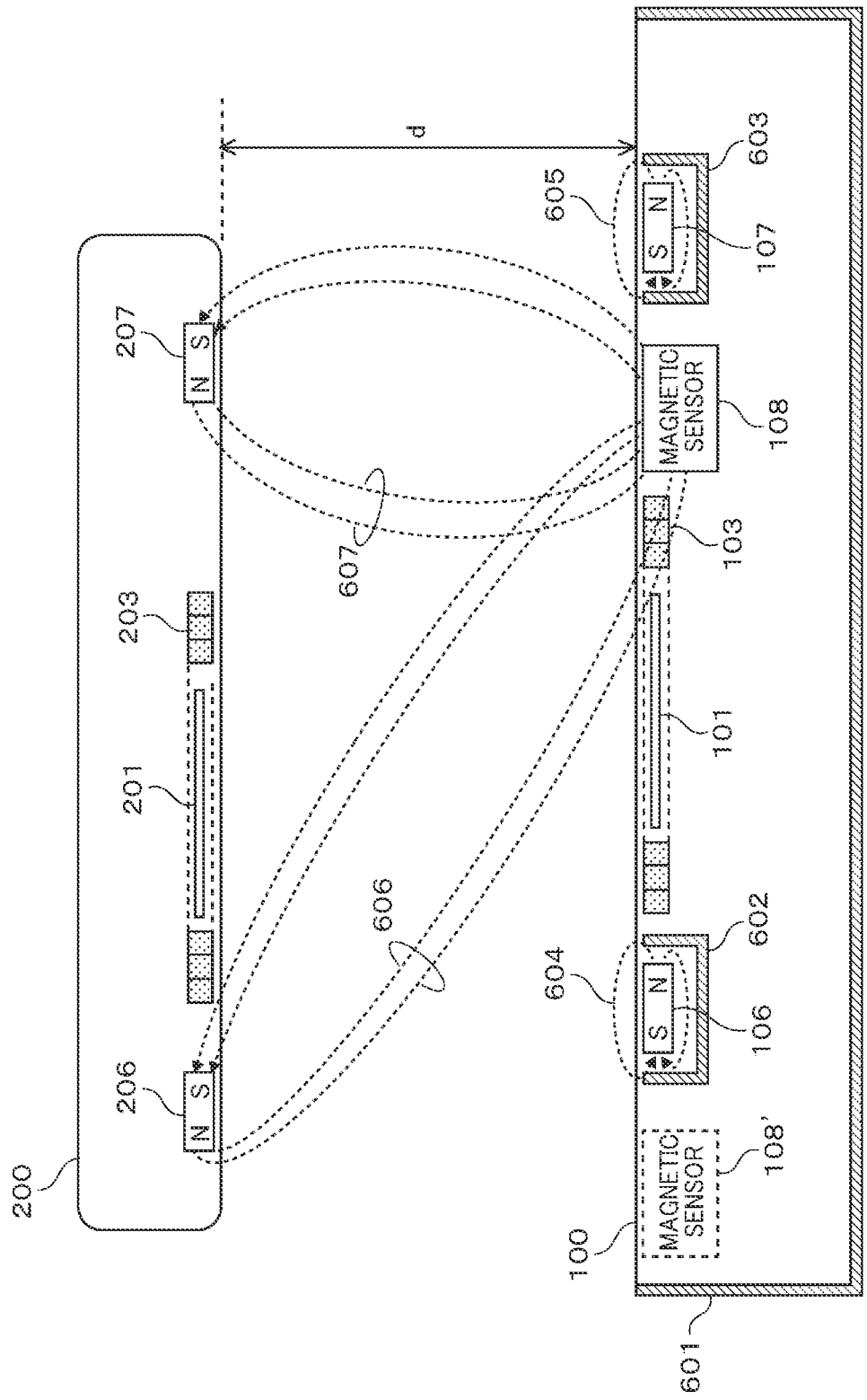

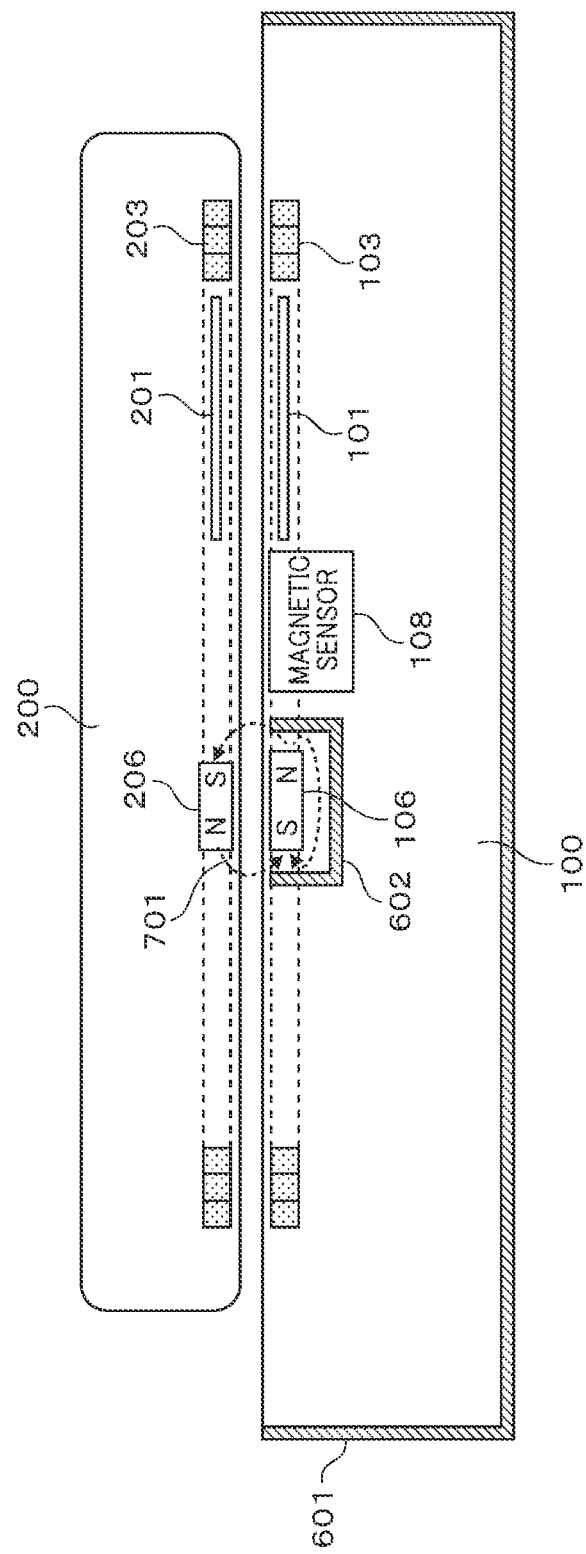

POWER FEED SYSTEM

CROSS REFERENCE TO RELATED APPLICATION

This patent application is the U.S. National Phase under 35 U.S.C. § 371 of International Application No. PCT/JP2019/018774, filed on May 10, 2019, the entire contents are hereby incorporated by reference.

TECHNICAL FIELD

The present invention relates to a power supply system for wirelessly supplying power from a power transmission device to a small mobile device, such as a mobile information terminal or a smart watch.

BACKGROUND ART

Methods for supplying power wirelessly include an electromagnetic induction method, a magnetic resonance method, and a radio wave reception method, and an appropriate method is adopted according to conditions such as an inter-device distance between a power transmission device and a power reception device or power to be supplied. Regarding the efficiency of wireless power supply, for example, Patent Document 1 describes "power transmission device including an acquisition means for acquiring distance information indicating the distance between the power reception device and the power transmission device and a change means for changing the power supply area in wireless power transmission based on the distance information acquired by the acquisition means" in order to realize energy saving when the power transmission device supplies power to the power reception device by wireless power transmission.

In addition, Patent Document 2 describes a wearable power supply device for wirelessly supplying power to a wearable device worn by a user, and the wearable power supply device is configured to be attracted to the wearable device by the force of a magnet and to transmit power by an induction coil. At this time, it is described that the attractive force of the magnet aligns the induction coil to improve the efficiency of power transmission.

CITATION LIST

Patent Document

Patent Document 1: JP 2015-126635 A
Patent Document 2: US 2017/0033567 A

SUMMARY OF THE INVENTION

Problems to be Solved by the Invention

When charging a small mobile device (power reception device), such as a mobile information terminal or a smart watch, with a power transmission device such as a mobile battery, it is preferable that power can be supplied wirelessly from the power transmission device. In addition, since there are various usage conditions of small mobile devices, it is preferable that the positional relationship between the power reception device and the power transmission device is not fixed and it is possible to cope with various states, such as a state in which the devices are in close contact with each other and a state in which the devices are apart from each other. In addition, in mobile batteries, it is necessary to prevent wasteful power consumption during power supply.

The technique disclosed in Patent Document 1 changes the output of wireless power transmission based on the inter-device distance between the power reception device and the power transmission device to change the power supply area. However, if the inter-device distance increases or misalignment between the devices increases, the power supply efficiency is reduced and wasteful power supply is performed, but this is not taken into consideration.

In addition, the technique disclosed in Patent Document 2 is to attract the wearable device and the wearable power supply device with a magnet to align the wearable device and the wearable power supply device. That is, the technique is based on the assumption that the wearable device and the wearable power supply device are used in close contact with each other, and performing a power supply operation in a state in which the wearable device and the wearable power supply device are apart from each other is not taken into consideration.

It is an object of the present invention to provide a power supply system capable of appropriately performing wireless power supply by preventing a decrease in power supply efficiency by responding to an inter-device distance or misalignment between a power transmission device and a power reception device.

Solutions to Problems

The present invention is a power supply system for wirelessly supplying power between a power transmission device and a power reception device. The power transmission device includes: a power transmission unit for generating supply power and transmitting the generated supply power to the power reception device; a power transmission side magnet for alignment with the power reception device; a magnetic sensor for detecting a magnetic force from a power reception side magnet provided in the power reception device; and a control unit for controlling the power transmission device. The power reception device includes: a power reception unit for receiving the supply power supplied from the power transmission device; the power reception side magnet for alignment with the power transmission device; and a control unit for controlling the power reception device. When the power transmission device and the power reception device are in close contact with each other, power is wirelessly transmitted from the power transmission unit to the power reception unit in a state in which the power transmission unit and the power reception unit are aligned by an attractive magnetic force between the power transmission side magnet and the power reception side magnet. When the power transmission device and the power reception device are apart from each other, the control unit of the power transmission device starts or stops power transmission from the power transmission unit according to a magnetic force detection signal from the power reception side magnet detected by the magnetic sensor.

Effects of the Invention

According to the present invention, it is possible to realize a power supply system that appropriately performs wireless power supply by preventing a decrease in power supply efficiency without wasting power according to the inter-device distance between the power transmission device and the power reception device and by eliminating misalignment between the devices.

BRIEF DESCRIPTION OF THE DRAWINGS

FIG. 1B is a block diagram showing a configuration example of a power supply system (power reception device) according to the first embodiment.

FIG. 2A is a diagram showing a relationship between an inter-device distance and power supply efficiency.

FIG. 2B is a diagram showing a relationship between an inter-device distance and a magnetic force detection signal of a magnetic sensor.

FIG. 6B is a cross-sectional view when a power transmission device and a power reception device are closely arranged.

FIG. 6C is a cross-sectional view when a power transmission device and a power reception device are arranged apart from each other.

FIG. 7B is a cross-sectional view when a power transmission device and a power reception device are closely arranged.

MODE FOR CARRYING OUT THE INVENTION

Hereinafter, embodiments of the present invention will be described with reference to the diagrams.

First Embodiment

In a first embodiment, the basic configuration and operation of a power supply system of the present invention will be described.

Figure 1A:
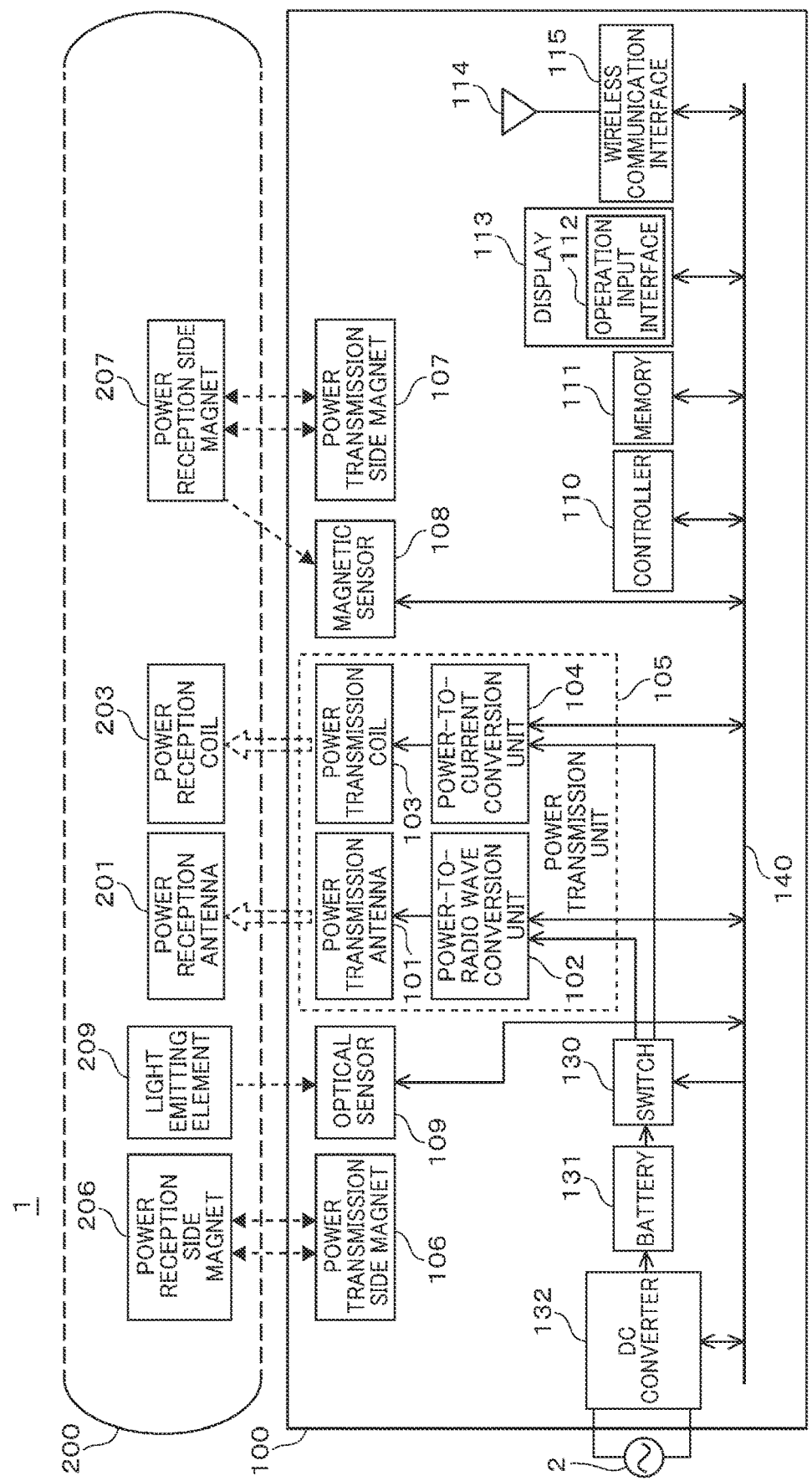
FIG. 1A is a block diagram showing a configuration example of a power supply system (power transmission device) according to a first embodiment.

FIGS. 1A and 1B are block diagrams showing a configuration example of a power supply system 1 according to the first embodiment. The power supply system 1 is configured to include a power transmission device 100 and a power reception device 200, and power wirelessly transmitted from the power transmission device 100 is received by the power reception device 200. FIG. 1A shows the internal configuration of the power transmission device 100, and FIG. 1B shows the internal configuration of the power reception device 200. The power transmission device 100 shown in FIG. 1A shows a case of a mobile battery that has a built-in battery charged by an external AC power supply and wirelessly supplies power stored in the built-in battery to the power reception device 200. In addition, the power reception device 200 shown in FIG. 1B shows a case of a smart watch that is a multifunctional wristwatch-type wearable device. The smart watch is powered by a built-in battery, has a display with a small touch screen, a speaker, a microphone, a vibrator, operation buttons, and a human body sensor such as a heart rate sensor, and can communicate various kinds of information and make voice calls through wireless communication. Hereinafter, the configuration of each device will be described in detail.

In FIG. 1A, the power transmission device 100, which is a mobile battery, includes a power transmission antenna 101, a power-to-radio wave conversion unit 102, a power transmission coil 103, and a power-to-current conversion unit 104 as a power transmission unit 105. In addition, the power transmission device 100 includes power transmission side magnets 106 and 107, a magnetic sensor 108, an optical sensor 109, a control unit 110, a memory unit 111, a display unit 113 having an operation input unit 112, and a short-range wireless communication unit 115 including a transmission and reception antenna 114. In addition, the power transmission device 100 includes a DC converter 132 for converting external AC power 2 into DC power, a battery 131, and a switch 130. The components excluding the battery 131 and the power transmission side magnets 106 and 107 are connected to each other through a bus 140.

In FIG. 1B, the power reception device 200, which is a smart watch, includes a power reception antenna 201, a radio wave power reproduction unit 202, a power reception coil 203, and a coil power reproduction unit 204 as a power reception unit 205. In addition, the power reception device 200 includes power reception side magnets 206 and 207, a light emitting element 209, a control unit 210, a memory unit 211, a display unit 213 having an operation input unit 212, a short-range wireless communication unit 215 including a transmission and reception antenna 214, a sound input and output unit 216, and a vibrator 217. In addition, the power reception device 200 includes a human body sensor 218 such as a heart rate sensor, a wearing detection unit 219, a position measurement unit 220, a base station communication unit 222 including a transmission and reception antenna 221, a switch 230, a charge processing unit 231, and a battery 232. The components excluding the power reception side magnets 206 and 207 and the battery 232 are connected to each other through a bus 240.

Next, the operation of the power supply system 1 will be described from the power transmission device 100 side. DC power is supplied from the battery 131 to the power transmission unit 105 through the switch 130. The power-to-radio wave conversion unit 102 in the power transmission unit 105 converts the DC power supply power supplied from the battery 131 into radio waves, and the power transmission antenna 101 radiates the converted radio waves to the outside. The radiated radio waves are converted into power by the power reception antenna 201 on the power reception device 200 side. In this case, wireless power supply is performed by a so-called radio wave reception method. Therefore, the power supply efficiency is not high, but relatively large power can be transmitted over a long distance. At that time, in the radio wave band, microwaves or millimeter waves having a wavelength of 1 meter to 1 millimeter are used.

On the other hand, the power-to-current conversion unit 104 in the power transmission unit 105 converts the DC power supply power supplied from the battery 131 into an alternating current, and the converted alternating current flows through the power transmission coil 103. Due to the alternating current flowing through the power transmission coil 103, a magnetic flux passing through the power transmission coil 103 is generated. At this time, a magnetic flux is also generated in the power reception coil 203 on the power reception device 200 side arranged close to the power transmission coil 103 to induce an alternating current. As a result, power is wirelessly supplied to the power reception coil 203. In this case, the wireless power supply is performed by a so-called electromagnetic induction method, and stable wireless power supply is possible when the power transmission device 100 and the power reception device 200 are closely aligned with each other. However, if the inter-device distance increases or misalignment between the coils occurs, the power supply efficiency decreases.

In addition, by arranging the coils so as to face each other as in the electromagnetic induction method, it is possible to operate the coils in a magnetic resonance method. In the magnetic resonance method, the vibration of the magnetic field generated by the flow of an alternating current through the power transmission coil 103 is transmitted to a resonance circuit configured to include the power reception coil 203 that resonates at the same frequency, so that power is wirelessly supplied to the power reception coil 203. In the case of the magnetic resonance method, there is some margin in the alignment between the coils as compared with the case of the electromagnetic induction method. However, in order to transmit the vibration of the magnetic field, it is necessary to arrange the power reception coil 203 at a distance sufficiently smaller than the wavelength of the frequency at which the power reception coil 203 is used, and it is necessary to shorten the inter-device distance as in the case of the electromagnetic induction method.

The power transmission side magnets 106 and 107 are magnets arranged near the surface of the power transmission device 100. When the power transmission device 100 and the power reception device 200 are closely arranged, the power transmission device 100 and the power reception device 200 are attracted to each other by the magnetic force between the power reception side magnets 206 and 207 arranged at opposite positions in the power reception device 200. As a result, the power transmission coil 103 and the power reception coil 203 can be accurately aligned, and the efficiency of power supply from the power transmission coil 103 to the power reception coil 203 can be maximized.

The magnetic sensor 108 detects the magnetic force from the power reception side magnets 206 and 207 and generates a magnetic force detection signal. The level of the generated magnetic force detection signal depends on the inter-device distance between the power transmission device 100 and the power reception device 200. The shorter the distance, the higher the signal level, and the longer the distance, the lower the signal level. Therefore, the inter-device distance can be determined by the level of the magnetic force detection signal. As the magnetic sensor 108, for example, a Hall element that outputs a voltage according to the magnetic flux density or the direction when a current flows through a semiconductor thin film or the like can be used. Since the Hall element can detect even a static magnetic field in which there is no magnetic flux density change, the Hall element is suitable for detecting the magnetic force from the magnet.

The optical sensor 109 detects light from the light emitting element 209 on the power reception device 200 side. For example, a light inlet and a light outlet are provided on the facing surfaces of the power transmission device 100 and the power reception device 200 with the power transmission unit 105 (power transmission coil 103) and the power reception unit 205 (power reception coil 203) aligned. Then, the alignment of the power transmission unit 105 and the power reception unit 205 is determined by detecting the light emitted from the light emitting element 209 with the optical sensor 109.

The control unit 110 is configured to include a CPU (Central Processing Unit) and the like, and executes a program such as an OS (Operating System) or an operation control application stored and stored in the memory unit 111. Then, the operation of the entire power transmission device 100 is controlled according to the operation information input to the operation input unit 112, the magnetic force detection signal from the magnetic sensor 108, or the like.

For example, in a state in which the power transmission device 100 and the power reception device 200 are closely arranged and the power transmission coil 103 and the power reception coil 203 are aligned by the attractive force of the power transmission side magnets 106 and 107 and the power reception side magnets 206 and 207, the switch 130 is operated to supply the DC power from the battery 131 to the power-to-current conversion unit 104. Then, control is performed so that power is wirelessly supplied from the power transmission coil 103 using the electromagnetic induction method or the magnetic resonance method. In addition, when the power transmission device 100 and the power reception device 20 are not closely arranged, the switch 130 is operated to supply the DC power from the battery 131 to the power-to-radio wave conversion unit 102. Then, control is performed so that power is wirelessly supplied from the power transmission antenna 101 using the radio wave reception method. In addition, the control unit 110 determines the inter-device distance between the power transmission device 100 and the power reception device 200 based on the magnetic force detection signal from the magnetic sensor 108. When the magnetic force detection signal is less than a predetermined level (when the inter-device distance is larger than a predetermined value), the control unit 110 performs control to stop the wireless power supply using the radio wave reception method.

The memory unit 111 is a flash memory or the like, and stores not only various programs used by the control unit 110 but also data such as information set and input by the operation input unit 112, a magnetic force detection signal detected by the magnetic sensor 108, and communication information between the wireless communication units 115 and 215.

The operation input unit 112 is a user input means using, for example, a keyboard or key buttons. FIG. 1A shows a case where an input operation screen is displayed within the display screen of the display unit 113. For example, the operation input unit 112 is a touch pad type input means such as a capacitance type input means, and detects an approach or contact operation using a finger or a touch pen as an operation input. In addition, an operation input unit such as a keyboard may be provided separately from the display unit 113, or may be separated from the main body of the power transmission device 100 and connected by wire or wirelessly. In addition, the user may give an instruction for the operation input by voice, and a microphone may collect the sound to acquire the operation input information.

The display unit 113 is configured by using a liquid crystal panel or the like, and displays notifications to the user and various kinds of data information. For example, the power transmission operation state of the power transmission device 100, the remaining amount or charge state of the battery 131, information of communication with the power reception device 200, and the like are displayed.

The short-range wireless communication unit 115 performs wireless communication of information regarding the power supply operation with the wireless communication unit 215 of the power reception device 200. In addition, when the power transmission device 100 and the power reception device 200 are connected to each other, information necessary for performing a pairing operation, which is the work of authenticating each other, is communicated. In addition, for example, an electronic tag can be used for the short-range wireless communication units 115 and 215. In addition, if wireless communication is possible in a short distance, it is possible to use a wireless LAN, such as Bluetooth (registered trademark), IrDA (Infrared Data Association, registered trademark), Zigbee (registered trademark), HomeRF (Home Radio Frequency, registered trademark), or Wi-Fi (registered trademark).

The switch 130 of the power transmission device 100 switches to the power-to-radio wave conversion unit 102 or the power-to-current conversion unit 104 according to the instruction from the control unit 110 to supply the DC power from the battery 131. The battery 131 drives each component in the power transmission device 100, and is charged by the DC power obtained as a result of conversion from the external AC power 2 by the DC converter 132 when the battery capacity decreases.

Next, an operation on the power reception device 200 side will be described. The power reception unit 205 receives the power transmitted from the power transmission unit 105 of the power transmission device 100. In the case of the radio wave reception method, the radio wave radiated from the power transmission antenna 101 is received by the power reception antenna 201, and the radio wave power reproduction unit 202 converts the received radio wave into a direct current to reproduce DC power supply power. On the other hand, in the case of the electromagnetic induction method or the magnetic resonance method, an alternating current is induced in the power reception coil 203 from the alternating current flowing through the power transmission coil 103, and the coil power reproduction unit 204 converts the induced alternating current into a direct current to reproduce DC power supply power.

The power reception side magnets 206 and 207 are magnets arranged near the surface of the power reception device 200. When the power transmission device 100 and the power reception device 200 are closely arranged, the power reception side magnets 206 and 207 and the power transmission side magnets 106 and 107 facing each other attract each other by magnetic force. Therefore, the power transmission coil 103 and the power reception coil 203 can be accurately aligned, and the efficiency of power supply from the power transmission coil 103 to the power reception coil 203 can be maximized.

A light emitting element, such as an LED, is used as the light emitting element 209. The light emitted from the light emitting element 209 is detected by the optical sensor 109 on the power transmission device 100 side, and is used for determining the alignment between the power transmission unit 105 and the power reception unit 205.

Similarly to the control unit 110, the control unit 210 is configured to include a CPU and the like, and executes a program such as an OS or an operation control application stored and stored in the memory unit 111. Then, the operation of the entire power reception device 200 is controlled according to the operation information input by the operation input unit 212 or the like. Similarly to the memory unit 111, the memory unit 211 is a flash memory or the like, and stores not only various programs used by the control unit 210 but also data such as information set and input by the operation input unit 212, signal information detected by various sensors, and communication information between the wireless communication units 115 and 215.

Similarly to the operation input unit 112, the operation input unit 212 is a user input means using a keyboard, key buttons, or the like. FIG. 1B shows a case where an input operation screen is displayed within the display screen of the display unit 213. For example, the operation input unit 212 is a touch pad type input means such as a capacitance type input means.

Similarly to the display unit 113, the display unit 213 is configured by using a liquid crystal panel or the like, and displays notifications to the user and various kinds of data information. For example, the power reception operation state of the power reception device 200, the remaining amount or charge state of the battery 232, information of communication with the power transmission device 100, and the like are displayed.

The sound input and output unit 216 includes a microphone for receiving sound from the outside and a speaker for outputting sound to the outside, and processes sound that is input and output. The vibrator 217 generates vibration according to a control signal from the control unit 210. When the vibrator 217 is worn on the user's body, the generated vibration can be reliably transmitted to the user. As a result, the notification information to the user generated in the power reception device 200 can be transmitted as tactile vibration. In addition, the notification information to the user generated on the power transmission device 100 side can also be transmitted through the wireless communication units 115 and 215 by the vibrator 217 of the power reception device 200.

The human body sensor 218 includes a heart rate sensor, a blood pressure sensor, a body temperature sensor, and the like, and is worn in close contact with the user's body to detect the user's heart rate, blood pressure, and body temperature. The detected value such as the heart rate can be displayed on the display unit 213, and can be transmitted to the power transmission device 100 through the short-range wireless communication units 215 and 115 and displayed on the display unit 113 on the power transmission device 100 side. The wearing detection unit 219 detects that the power reception device 200 is worn by the user and generates a wearing detection signal. For example, it is possible to detect whether or not the user is wearing the power reception device 200 based on the heart rate or blood pressure detected by the human body sensor 218.

The position measurement unit 220 uses a GPS (Global Positioning System), which is a position information measurement system using artificial satellites, to receive radio waves from satellites and measure the current position (longitude, latitude, altitude) of the signal reception device 200. In addition, as the position measurement unit 220, an indoor position measurement system other than the GPS can also be used. The base station communication unit 222 is a communication interface that performs long-distance wireless communication with a mobile phone base station through the transmission and reception antenna 221, and this enables communication of various kinds of information, voice communication, and the like.

The switch 230 of the power reception device 200 performs switching to the radio wave power reproduction unit 202 or the coil power reproduction unit 204 that reproduces the DC power supply power, and outputs the reproduced power to the charge processing unit 231. The charge processing unit 231 charges the battery 232 using the input DC power supply power. In addition, regarding the switching operation of the switch 230, power supply method information (radio wave reception method/electromagnetic induction method or magnetic resonance method) may be acquired from the power transmission device 100 side through the short-range wireless communication units 115 and 215, and the control unit 210 may control the switch 230.

With the above-described configuration and operation, when the power transmission device 100 and the power reception device 200 are in close contact with each other, the power transmission side magnets 106 and 107 and the power reception side magnets 206 and 207 are attracted to each other by magnetic force, so that the power transmission unit 105 (power transmission coil 103) of the power transmission device 100 and the power reception unit 205 (power reception coil 203) of the power reception device 200 are accurately aligned. In this state, the electromagnetic induction method or the magnetic resonance method can be selected to perform wireless power supply most efficiently.

In addition, in a state in which the power transmission device 100 and the power reception device 200 are not aligned with each other, the distance between the devices is determined by the magnetic force detection signal from the magnetic sensor 108. When the magnetic force detection signal is equal to or higher than a predetermined level (the distance is equal to or less than a predetermined value), a radio wave reception method for wirelessly supplying power from the power transmission antenna 101 to the power reception antenna 20 is selected. In addition, when the magnetic force detection signal is less than the predetermined level (the distance is larger than the predetermined value), the wireless power supply using the radio wave reception method is stopped.

Thus, it is possible to select a power supply method having a highest power supply efficiency according to the alignment or distance between the devices. In addition, by stopping the power supply in a state in which the inter-device distance becomes too long and accordingly the power supply efficiency is significantly lowered, it is possible to prevent unnecessary consumption of the battery on the power transmission device side. As a result, the built-in battery is efficiently charged on the power reception device side, and many functions of the smart watch provided in the power reception device can be used for a long time. In addition, in the configuration of the present embodiment, the power transmission side magnets 106 and 107 and the power reception side magnets 206 and 207 are used for the alignment between the power transmission device 100 and the power reception device 200, and the magnetic force generated by the power reception side magnets 206 and 207 is detected by the magnetic sensor 108 to determine the inter-device distance. Therefore, there is an advantage that the device configuration can be simplified.

Next, the operation of the power supply system of the present embodiment will be described in detail. In the following description, the power supply method based on the radio wave reception method will be referred to as an "antenna method", and the power supply method based on the electromagnetic induction method or the magnetic resonance method will be referred to as a "coil method".

FIG. 2A is a diagram showing the relationship between the distance between a power transmission device and a power reception device and the power supply efficiency at the time of wireless power supply. The horizontal axis schematically shows an inter-device distance d, and the vertical axis schematically shows power supply efficiency p. The power supply efficiency p is the ratio of the power (received power) received by the power reception unit 205 to the power (transmitted power) transmitted from the power transmission unit 105, and the ideal state without loss is the efficiency p0 (=100%). A curve 301 shows the characteristics in the case of the coil method, and a curve 302 shows the characteristics in the case of the antenna method.

In the case of the coil method (curve 301), high efficiency p1 is shown when the distance d=0, but the efficiency p drops abruptly when the power transmission device and the power reception device are apart from each other (distance d increases). On the other hand, in the case of the antenna method (curve 302), the efficiency p2 at the distance d=0 is lower than the efficiency p1 in the coil method, but the decrease in efficiency is gradual even if the distance d increases, and decreases approximately inversely proportional to the square of the distance d. Then, both the curves cross each other at a position of a distance d1, and the efficiency at that time is p3. Therefore, as a power supply method for maximizing the power supply efficiency, it is preferable to select the coil method (curve 301) in the range of the distance d1 or less and switch to the antenna method (curve 302) at the distance d1 or more.

In addition, a distance at which the efficiency of the antenna method decreases to p4 with an increase in the distance d is assumed to be d2. This efficiency p4 is an allowable value of the power supply efficiency. If the efficiency is less than this, the transmitted power is not effectively transmitted, and the battery power of the power transmission device 100 is wasted. Therefore, when the distance is larger than d2, the power supply operation is stopped as shown by the broken line 303. The allowable value p4 of the efficiency or the distance d2 shown herein is determined depending on the specifications of the power transmission device 100 or the battery 131.

In the following description, the state where the inter-device distance d=0 is referred to as a "close state" or "aligned state", the range of 0<d<d2 is referred to as a "short distance state", and the range of d>d2 is referred to as a "long distance state". In addition, the distance d1 is referred to as an "efficiency reversal distance", and the distance d2 is referred to as an "efficiency limit distance".

FIG. 2B is a diagram showing the relationship between the distance between a power transmission device and a power reception device and the magnetic force detection signal of a magnetic sensor. The horizontal axis shows the inter-device distance d, and the vertical axis shows the level of a magnetic force detection signal m. The magnetic sensor 108 in the power transmission device 100 detects the magnetic force from the power reception side magnets 206 and 207 provided in the power reception device 200, and the magnetic force detection signal m changes as shown in the curve 304. In practice, the shape of the curve is affected by the shape of the magnet or the position of the magnetic sensor, but is shown schematically herein.

The magnetic force detection signal m indicates a level m0 when the inter-device distance d=0 (close state), but decreases as the distance d increases, and decreases approximately inversely proportional to the square of the distance d. At the distance d1 (efficiency reversal distance) described with reference to FIG. 2A, the magnetic force detection signal m decreases to level m1, and at the distance d2 (efficiency limit distance), the magnetic force detection signal m decreases to level m2. Therefore, the power transmission device 100 determines the inter-device distance d based on the level of the magnetic force detection signal m, and controls the operation of supplying power to the power reception device 200 in consideration of the characteristics of the power supply efficiency shown in FIG. 2A.

Figure 3:
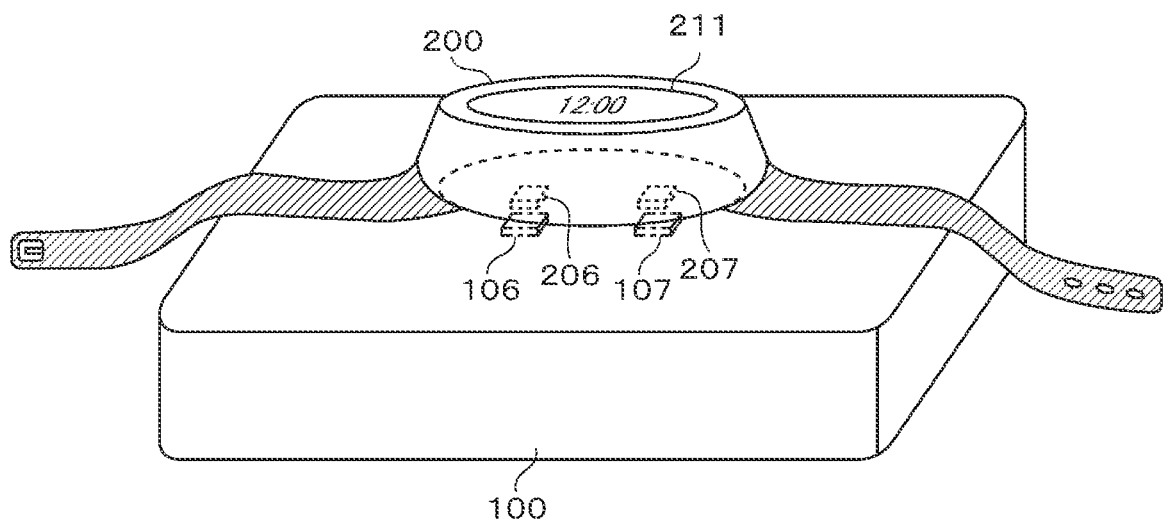
FIG. 3 is a diagram showing a state in which a power transmission device and a power reception device are closely arranged.

FIG. 3 is a diagram schematically showing a state in which a power transmission device and a power reception device are closely arranged. Here, a state is shown in which the user detaches a smart watch, which is the power reception device 200, and arranges the smart watch closely on the power transmission device 100 to supply power. The power transmission side magnets 106 and 107 and the power reception side magnets 206 and 207 are attracted to each other to be positioned. The upper surface of the smart watch is the display unit 213, and for example, the time is displayed. In this state, the electromagnetic induction method or the magnetic resonance method (coil method) having a high power supply efficiency can be selected, and the power supply operation can be performed in the vicinity of the efficiency p1 according to the curve 301 shown in FIG. 2A.

Figure 4:
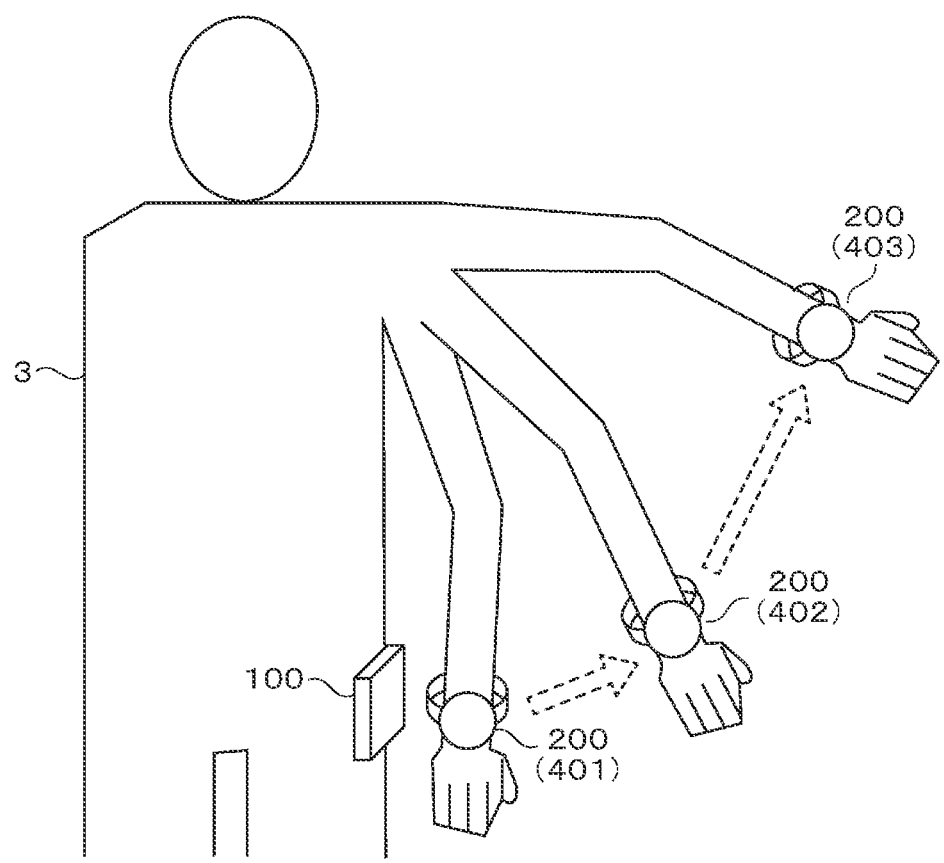
FIG. 4 is a diagram showing a state in which a power transmission device and a power reception device are arranged apart from each other.

FIG. 4 is a diagram schematically showing a state in which a power transmission device and a power reception device are arranged apart from each other. Here, the power transmission device 100 is attached to the body of a user 3. Then, the smart watch, which is the power reception device 200, is worn on the wrist to supply power. When the user 3 moves his arm, the position of the power reception device 200 changes to 401, 402, and 403.

Corresponding to the inter-device distance d in FIG. 2A, when the power reception device 200 is located at the positions 401 and 402 close to the power transmission device 100, the inter-device distance d is the efficiency reversal distance d1 or more and the efficiency limit distance d2 or less. Therefore, the radio wave reception method (antenna method) is selected, and wireless power supply is performed in the range of efficiency p3 to p4 according to the curve 302. When the power reception device 200 is located at the position 403 far from the power transmission device 100, the inter-device distance d exceeds d2 and the efficiency is less than the allowable value p4, so that the wireless power supply based on the radio wave reception method is stopped. In this manner, by performing control so that the power is supplied only when the inter-device distance is short, it is possible to obtain the effect of preventing the transmitted power from being wasted.

Next, the operation of the power supply system of the present embodiment will be described with reference to the flowcharts shown in FIGS. 5A to 5C. Cases are divided on how to switch between the coil method and the antenna method, which are power supply methods.

Figure 5A:
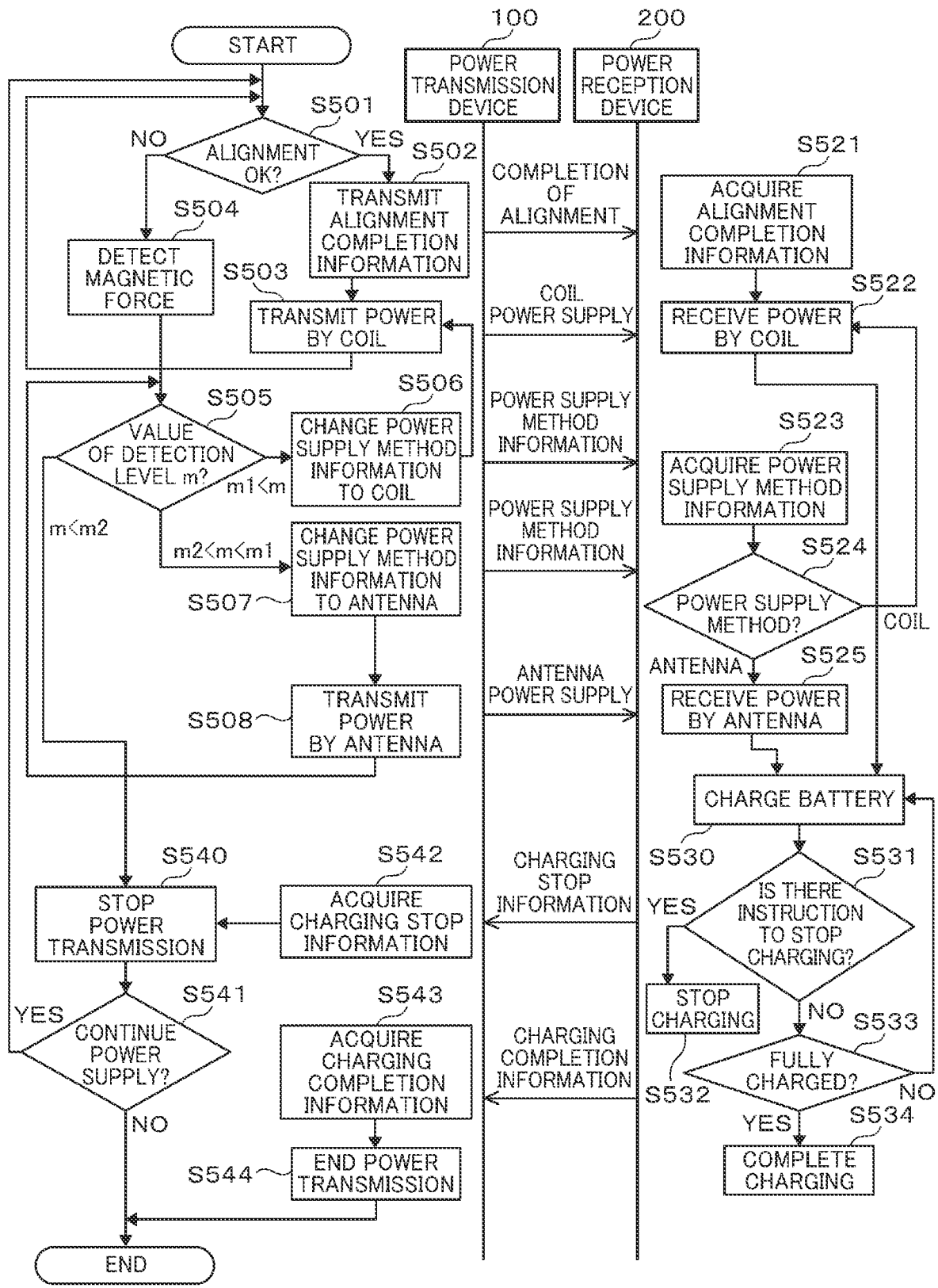
FIG. 5A is a flowchart when a power supply method is switched so as to maximize the power supply efficiency.

FIG. 5A is a flowchart when the power supply method is automatically switched so as to maximize the power supply efficiency. Here, the efficiency reversal distance d1 (intersection of the curves 301 and 302) in FIGS. 2A and 2B is used as a threshold value for switching. The procedure will be described below along with the steps.

When wireless power supply is started by an operation input to the operation input unit 112, the power transmission device 100 determines the arrangement state of the power transmission device 100 and the power reception device 200. That is, it is identified and determined whether or not the power transmission side magnets 106 and 107 and the power reception side magnets 206 and 207 are closely arranged by the magnetic force of each other and aligned with each other (S501). In this case, the alignment between the devices is determined from the detection level of the light emitted from the light emitting element 209 of the power reception device 200 received by the optical sensor 109.

If the power transmission device 100 and the power reception device 200 are aligned in the determination of S501 (S501, Yes), the power transmission device 100 generates alignment completion information indicating that the alignment between the power transmission device 100 and the power reception device 200 has been completed (S502), and transmits the generated alignment completion information to the power reception device 200 by using the wireless communication unit 115. Then, a power transmission operation is performed in the coil method by the power transmission coil 103, and the power transmission operation state is displayed on the display unit 113 to notify the user (S503).

The power reception device 200 receives and acquires the alignment completion information transmitted from the power transmission device 100 by using the wireless communication unit 215. Then, the display unit 213 displays that the power transmission device 100 and the power reception device 200 are in the aligned state. Alternatively, the user is notified by the sound from the speaker of the sound input and output unit 216 and the tactile vibration by the vibrator 217 (S521). Then, in the power reception device 200, a power reception operation is performed by the power reception coil 203, and the power reception operation state is displayed on the display unit 213. Alternatively, the user is notified by the sound from the speaker of the sound input and output unit 216 and the tactile vibration by the vibrator 217 (S522).

On the other hand, in the power transmission device 100, if the power transmission device 100 and the power reception device 200 are not aligned in the determination of S501 (S501, No), in order to determine an appropriate power supply method, the magnetic force from the power reception side magnets 206 and 207 is detected by the magnetic sensor 108, and the magnetic force detection signal m is generated (S504). Then, the generated magnetic force detection signal m is compared with the levels m1 and m2 in FIG. 2B (S505).

If the value of the detection level m is m>m1, the inter-device distance is d<d1 (efficiency reversal distance), so that switching to the coil method is performed to maximize the power supply efficiency (S506). Then, a power transmission operation is performed by the power transmission coil 103, and the power transmission operation state is displayed on the display unit 113 to notify the user (S503). If the value of the detection level m is m2<m<m1, the inter-device distance is d1<d<d2, so that switching to the antenna method is performed to maximize the power supply efficiency (S507). Then, a power transmission operation is performed from the power transmission antenna 101, and the power transmission operation state is displayed on the display unit 113 to notify the user (S508).

In the determination of S505, when the value of the detection level m is m<m2, the inter-device distance is d>d2 (efficiency limit distance), so that the power transmission operation from the power transmission unit 105 is not performed (stopped or not started), and the display unit 113 displays that the power transmission operation is not performed to notify the user (S540). In addition, in this case, the power transmission device 100 may transmit power transmission stop information indicating that power transmission is not performed to the power reception device 200, and the power reception device 200 may display the fact on the display unit 213. Then, when the wireless power supply process is continuously performed (S541, Yes), the process returns to S501 to repeat the above process.

On the other hand, the power transmission device 100 transmits power supply method information selected by the determination of S505 to the power reception device 200 by using the wireless communication unit 115. The power reception device 200 receives and acquires the power supply method information from the power transmission device 100 by using the wireless communication unit 215 (S523). The power reception device 200 identifies the acquired power supply method information (S524).

When the power supply method is determined to be the coil method as a result of the identification in S524, the power reception operation is performed by the power reception coil 203 and the power reception operation state is displayed on the display unit 213 (S522). Alternatively, the user is notified by the sound input and output unit 216 or the vibrator 217. On the other hand, when the power supply method is determined to be the antenna method as a result of the identification of S524, the power reception operation is performed by the power reception antenna 201 and the power reception operation state is displayed on the display unit 213. Alternatively, the user is notified by the sound input and output unit 216 or the vibrator 217 (S525).

When the power reception device 200 receives power from the power transmission device 100, the charge processing unit 231 charges the battery 232 with the power received by the power reception coil 203 or the power reception antenna 201. Then, the state of charge to the battery 232 is displayed on the display unit 213, or the user is notified of the state of charge to the battery 232 by the sound input and output unit 216 or the vibrator 217 (S530).

When the power reception device 200 being charged receives a stop instruction during the charging operation (S531, Yes), the power reception device 200 stops the charging operation and notifies the user that the charging operation has been stopped through the display unit 213, the sound input and output unit 216, and the vibrator 217 (S532). Then, charging stop information is generated and transmitted to the power transmission device 100 through the wireless communication unit 215.

In the power transmission device 100, when the charging stop information from the power reception device 200 is acquired through the wireless communication unit 215 (S542), the power transmission operation from the power transmission unit 105 is stopped, and the power transmission operation stop is displayed on the display unit 113 to notify the user (S540). Also in this case, when the wireless power supply process is continued (S541, Yes), the process returns to S501 to repeat the process.

On the other hand, unless there is an instruction to stop charging from the user (S531, No), the power reception device 200 being charged continues the charging operation until the battery 232 is fully charged (S533, No). When the battery 232 is fully charged (S533, Yes), the charging operation is completed, and the user is notified of the completion of charging through the display unit 213, the sound input and output unit 216, and the vibrator 217 (S534). Then, the power reception device 200 transmits charging completion information to the power transmission device 100 by using the wireless communication unit 215.

When the power transmission device 100 acquires the charging completion information from the power reception device 200 through the wireless communication unit 215 (S543), the power transmission device 100 ends the power transmission operation from the power transmission unit 105 and displays the end of the power transmission operation on the display unit 113 (S544). Thus, the wireless power supply process ends.

According to the flowchart of FIG. 5A, the power supply method can be automatically switched so that the power supply efficiency p in FIG. 2A is maximized.

Figure 5B:
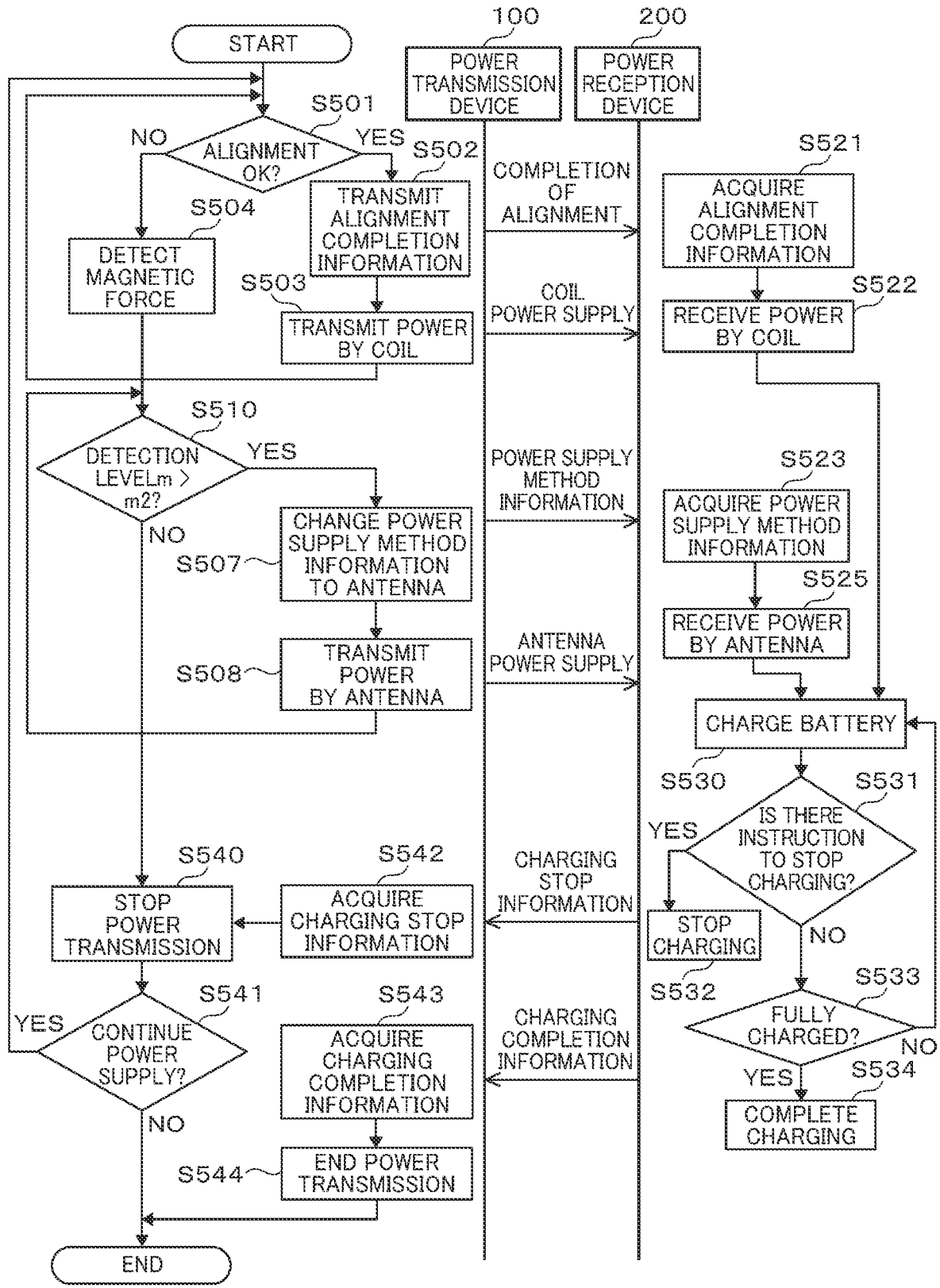
FIG. 5B is a flowchart when the switching of the power supply method in FIG. 5A is simplified.

FIG. 5B is a flowchart when the switching of the power supply method in FIG. 5A is simplified. Here, the method is switched depending on whether or not the inter-device distance in FIGS. 2A and 2B is d=0 (close state). That is, the coil method of the curve 301 is selected if d=0, and the antenna method of the curve 302 is selected unless d=0.

When wireless power supply is started by an operation input to the operation input unit 112, the power transmission device 100 determines the arrangement state of the power transmission device 100 and the power reception device 200. That is, it is identified and determined whether or not the power transmission side magnets 106 and 107 and the power reception side magnets 206 and 207 are closely arranged by the magnetic force of each other and aligned with each other (S501). The alignment between the devices is determined from the detection level of the light from the light emitting element 209 of the power reception device 200 received by the optical sensor 109.

If the power transmission device 100 and the power reception device 200 are aligned in the determination of S501 (S501, Yes), the power transmission device 100 generates alignment completion information indicating that the alignment between the power transmission device 100 and the power reception device 200 has been completed (S502), and transmits the generated alignment completion information to the power reception device 200 by using the wireless communication unit 115. Then, a power transmission operation is performed in the coil method by the power transmission coil 103, and the power transmission operation state is displayed on the display unit 113 to notify the user (S503).

The power reception device 200 receives and acquires the alignment completion information transmitted from the power transmission device 100 by using the wireless communication unit 215. Then, the display unit 213 displays that the power transmission device 100 and the power reception device 200 are aligned, or the user is notified that the power transmission device 100 and the power reception device 200 are aligned through the sound input and output unit 216 or the vibrator 217 (S521). Then, in the power reception device 200, a power reception operation is performed by the power reception coil 203, and the power reception operation state is displayed on the display unit 213 or the user is notified of the power reception operation state by the sound input and output unit 216 or the vibrator 217 (S522).

On the other hand, if the power transmission device 100 and the power reception device 200 are not aligned in the determination of S501 (S501, No), the power transmission device 100 determines the power supply efficiency based on the antenna method. Therefore, the magnetic sensor 108 detects the magnetic force from the power reception side magnets 206 and 207 and generates the magnetic force detection signal m (S504). Then, the generated magnetic force detection signal m is compared with the level m2 in FIG. 2B. That is, it is determined whether or not the inter-device distance d is within the efficiency limit distance d2 (S510).

When the value of the detection level m is m>m2 (S510, Yes), the inter-device distance is d<d2 (efficiency limit distance) and the power supply efficiency is equal to or greater than the allowable value p4, so that the power supply method is changed to the antenna method (S543). Then, a power transmission operation is performed from the power transmission antenna 101, and the power transmission operation state is displayed on the display unit 113 to notify the user (S508).

In addition, the power transmission device 100 transmits power supply method information, which indicates that the power supply method has been changed to the antenna method, to the power reception device 200 by using the wireless communication unit 115. When the power reception device 200 receives the power supply method information (antenna method) transmitted from the power transmission device 100 by using the wireless communication unit 215 (S523), the power reception operation is performed by the power reception antenna 201 and the power reception operation state is displayed on the display unit 213. Alternatively, the user is notified by the sound input and output unit 216 or the vibrator 217 (S525).

When the power reception device 200 receives power from the power transmission device 100, the charge processing unit 231 charges the battery 232 with the power received by the power reception coil 203 or the power reception antenna 201. Then, the state of charge to the battery 232 is displayed on the display unit 213, or the user is notified of the state of charge to the battery 232 by the sound input and output unit 216 or the vibrator 217 (S530).

When the value of the detection level m is m<m2 in the determination of S510 (S510, No) the inter-device distance is d>d2 (efficiency limit distance), so that the power transmission device 100 does not perform a power transmission operation from the power transmission unit 105 and displays on the display unit 113 that the power transmission operation is not performed to notify the user (S540). In addition, in this case, the power transmission device 100 may transmit power transmission stop information indicating that power transmission is not performed to the power reception device 200, and the power reception device 200 may display the fact on the display unit 213.

Subsequent operations (operations after S530 and S540) are the same as the flowchart of FIG. 5A, and accordingly the description thereof will be omitted. According to the flowchart of FIG. 5B, it is possible to perform automatic switching to the power supply method having a high power supply efficiency p while simplifying the process of determining the inter-device distance d.

Figure 5C:
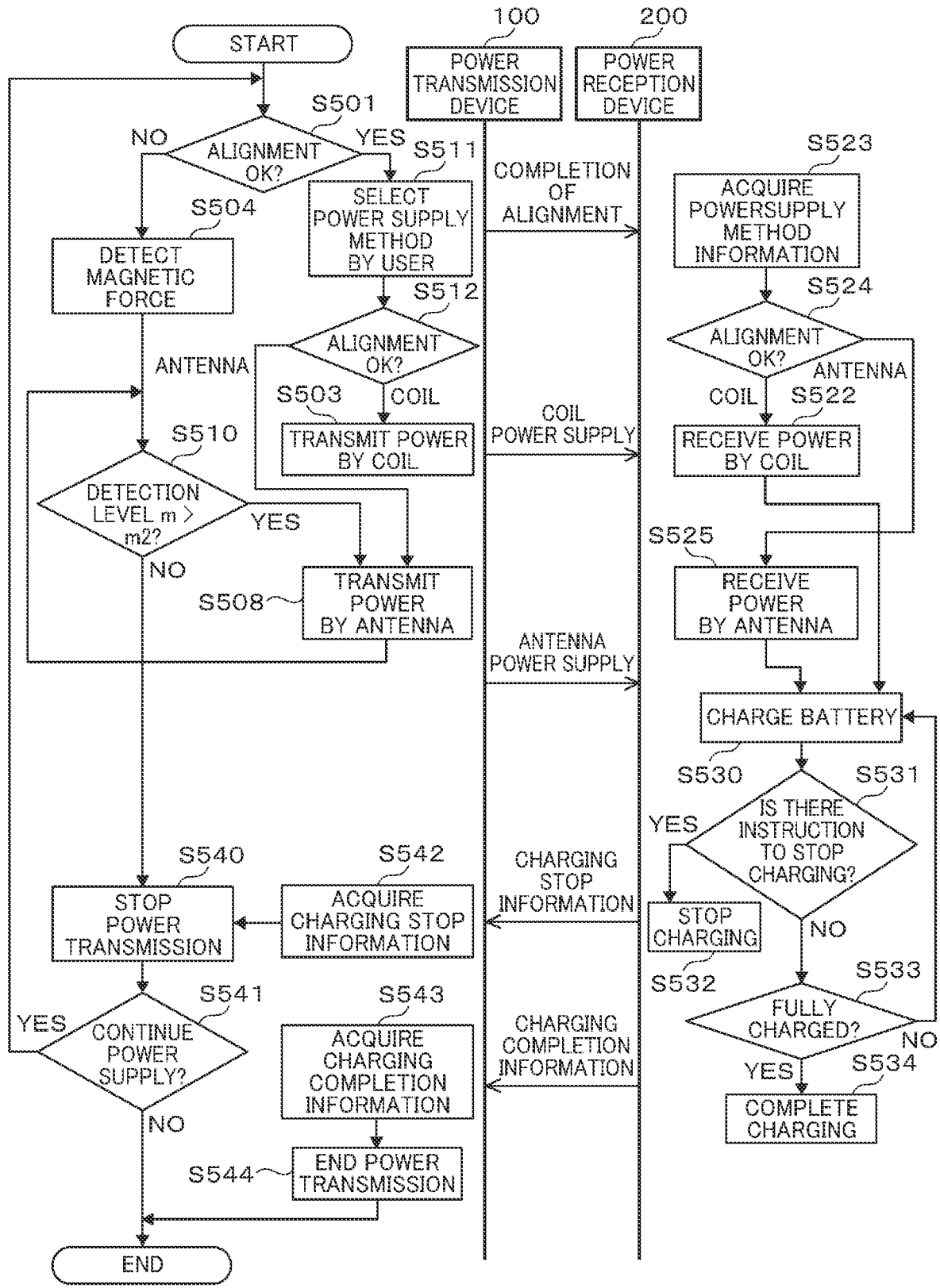
FIG. 5C is a flowchart when the user's selection is included in the switching of the power supply method in FIG. 5B.

FIG. 5C shows a flowchart when the user's selection is included in the switching of the power supply method in FIG. 5B. Here, even when the inter-device distance is d=0 (close state) in FIGS. 2A and 2B, the user selects whether to use the coil method or the antenna method.

When wireless power supply is started by an operation input to the operation input unit 112, the power transmission device 100 determines the arrangement state of the power transmission device 100 and the power reception device 200. That is, it is identified and determined whether or not the power transmission side magnets 106 and 107 and the power reception side magnets 206 and 207 are closely arranged by the magnetic force of each other and aligned with each other (S501). In this case, the alignment between the devices is determined from the detection level of the light emitted from the light emitting element 209 of the power reception device 200 received by the optical sensor 109.

If the power transmission device 100 and the power reception device 200 are aligned in the determination of S501 (S501, Yes), the user selects a method of power supply from the power transmission device 100 to the power reception device 200. When the user selects whether to use a coil method using a power transmission and reception coil or an antenna method using a power transmission and reception antenna by the operation input from the operation input unit 112 or the like, power supply method information indicating the selected power supply method is generated (S511).

The power transmission device 100 identifies the generated power supply method information (S512), and when the power supply method is a coil method, a power transmission operation is performed from the power transmission coil 103 and the power transmission operation state is displayed on the display unit 113 to notify the user (S503). On the other hand, when the power supply method is an antenna method, a power transmission operation is performed from the power transmission antenna 101 and the power transmission operation state is displayed on the display unit 113 to notify the user (S508).

The power transmission device 100 transmits the power supply method information generated in S511 to the power reception device 200 by using the wireless communication unit 115. The power reception device 200 acquires the power supply method information transmitted from the power transmission device 100 by using the wireless communication unit 215 (S523), and identifies which power supply method is used (S524).

As a result of the identification in S524, when the power supply method is a coil method, the power reception operation is performed by the power reception coil 203 (S522). On the other hand, when the power supply method is an antenna method, the power reception operation is performed by the power reception antenna 201 (S525). In both methods, the power reception operation state is displayed on the display unit 213, or the user is notified of the power reception operation state by the sound input and output unit 216 or the vibrator 217.

When the power reception device 200 receives power from the power transmission device 100, the charge processing unit 231 charges the battery 232 with the power received by the power reception coil 203 or the power reception antenna 201. Then, the state of charge to the battery 232 is displayed on the display unit 213, or the user is notified of the state of charge to the battery 232 by the sound input and output unit 216 or the vibrator 217 (S530).

On the other hand, if the power transmission device 100 and the power reception device 200 are not aligned in the determination of S501 (S501, No), the power transmission device 100 determines the power supply efficiency based on the antenna method. Therefore, the magnetic sensor 108 detects the magnetic force from the power reception side magnets 206 and 207 and generates the magnetic force detection signal m (S504). Then, the generated magnetic force detection signal m is compared with the level m2 in FIG. 2B. That is, it is determined whether or not the inter-device distance d is within the efficiency limit distance d2 (S510).

When the value of the detection level m is m>m2 (S510, Yes), the inter-device distance is d<d2 (efficiency limit distance) and the power supply efficiency is equal to or greater than the allowable value p4, so that the power supply method is switched to the antenna method (S543). Then, a power transmission operation is performed from the power transmission antenna 101, and the power transmission operation state is displayed on the display unit 113 to notify the user (S508).

When the value of the detection level m is m<m2 in the determination of S510 (S510, No) the inter-device distance is d>d2 (efficiency limit distance), so that the power transmission operation from the power transmission unit 105 is not performed, and the display unit 113 displays that the power transmission operation is not performed to notify the user (S540). In addition, in this case, the power transmission device 100 may transmit power transmission stop information indicating that power transmission is not performed to the power reception device 200, and the power reception device 200 may display the fact on the display unit 213. Subsequent operations (operations after S530 and S540) are the same as the flowchart of FIG. 5A, and accordingly the description thereof will be omitted.

According to the flowchart of FIG. 5C, since the user can select the power supply method at the time of close arrangement, it is possible to realize a convenient power supply operation according to the usage pattern of the user. For example, when the inter-device distance frequently repeats a close state and a short distance state, the user selects the antenna method so that the power supply method is not frequently switched. As a result, it is possible to perform a more stable power supply operation.

In any of the flowcharts of FIGS. 5A to 5C, when the inter-device distance becomes excessive, the power transmission device does not consume unnecessary power. In addition, it is possible to notify the user and realize a convenient and comprehensively efficient power supply operation. In addition, in each flowchart, notification (display) to the user is performed each time each operation (for example, a power transmission operation, a power reception operation) starts/ends, but the notification to the user may not be provided for all and may be limited to only some operations.

Next, the specific configuration of a power transmission unit and a power reception unit in a power supply system will be described.

Figure 6A:
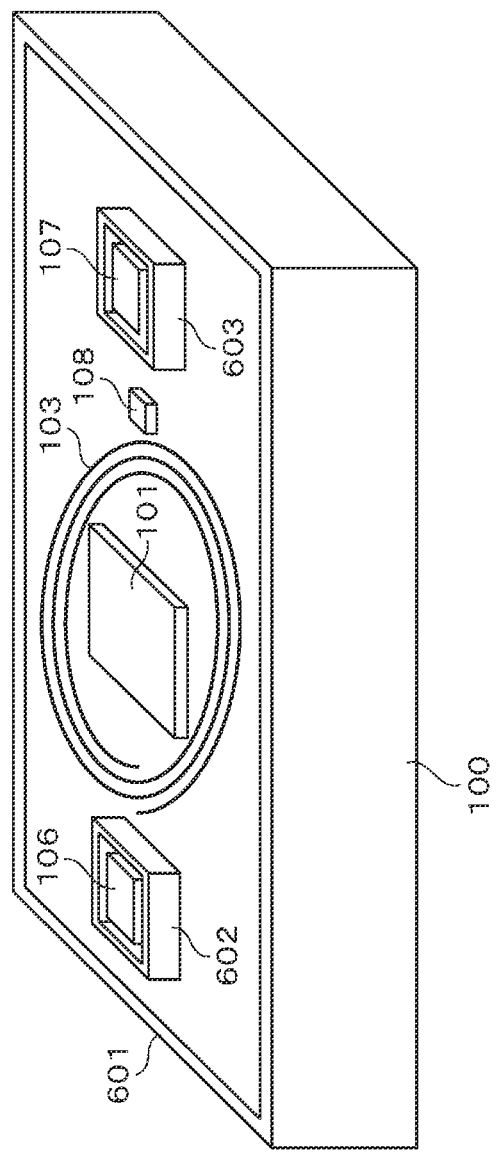
FIG. 6A is a bird's-eye view showing a configuration example of a power transmission unit of a power transmission device.

FIG. 6A is a bird's-eye view showing a configuration example of a power transmission unit of a power transmission device. On the upper surface of the power transmission device 100 (a surface facing the power reception device 200), the power transmission antenna 101 and the power transmission coil 103 as the power transmission unit 105, the power transmission side magnets 106 and 107, and the magnetic sensor 108 are arranged. The power transmission antenna 101 is arranged inside the power transmission coil 103 so as to be as close to the surface as possible. A ferromagnet 601 is provided on a surface (here, a side surface or a bottom surface) other than the direction in which the magnetic sensor 108 detects the magnetic force, and the magnetic sensor 108 is magnetically shielded so that the magnetic force from the side surface or bottom surface direction does not enter. In addition, ferromagnets 602 and 603 for magnetic shielding are respectively arranged around the power transmission side magnets 106 and 107. In addition, although the description of the configuration of the power reception unit 205 and the power reception side magnets 206 and 207 of the power reception device 200 is omitted in the diagrams, these are arranged at positions corresponding to the respective components of the power transmission device 100 in FIG. 6A.

FIG. 6B is a cross-sectional view when a power transmission device and a power reception device are closely arranged. When the power transmission device 100 and the power reception device 200 are in close contact with each other, a magnetic force 701 is concentrated between the power transmission side magnet 106 and the power reception side magnet 206 to cause a closed state and a magnetic force 702 is concentrated between the power transmission side magnet 107 and the power reception side magnet 207 to cause a closed state, so that these magnets are attracted to each other to enable accurate alignment. In addition, the alignment between the devices is determined by the light emitting element 209 and the optical sensor 109 shown in FIGS. 1A and 1B.

FIG. 6C is a cross-sectional view when a power transmission device and a power reception device are arranged apart from each other. The magnetic sensor 108 of the power transmission device 100 detects magnetic forces 606 and 607 from the power reception side magnets 206 and 207 of the facing power reception device 200, and the magnetic force detection signal m changes with respect to the inter-device distance d as shown in the curve 304 of FIG. 2B. At that time, since the magnetic force from a direction other than the upper surface (bottom surface or side surface direction) is shielded by the magnetic shielding action of the ferromagnet 601, the magnetic force detection signal can be accurately detected. In addition, since the ferromagnets 602 and 603 are provided so as to surround the power transmission side magnets 106 and 107, magnetic forces 604 and 605 from the power transmission side magnets 106 and 107 are magnetically shielded by the ferromagnets 602 and 603. Therefore, since the magnetic sensor 108 can detect only the magnetic forces 606 and 607 from the power reception side magnets 206 and 207, it is possible to generate an accurate magnetic force detection signal. Then, by using the curve 304 of FIG. 2B, the inter-device distance d is calculated from the level of the magnetic force detection signal m generated by the magnetic sensor 108. Then, by comparing the detection level m with the levels m1 (efficiency reversal position) and m2 (efficiency limit position) in FIG. 2B, it is possible to accurately control the switching of the power supply method and the stop of wireless power supply.

In addition, in the above description, the magnetic sensor 108 is provided in the vicinity of the power transmission side magnet 107, but a plurality of magnetic sensors may be provided. For example, as shown in FIGS. 6B and 6C, another magnetic sensor 108' (shown by a broken line) can be added in the vicinity of the power transmission side magnet 106, so that it is possible to further improve the detection accuracy by detecting the magnetic force with a plurality of sensors.

The specific configuration of the power transmission unit and the power reception unit is not limited to this, and various modification examples are possible. For example, it is possible to provide only one set of a power transmission side magnet and a power reception side magnet.

Figure 7A:
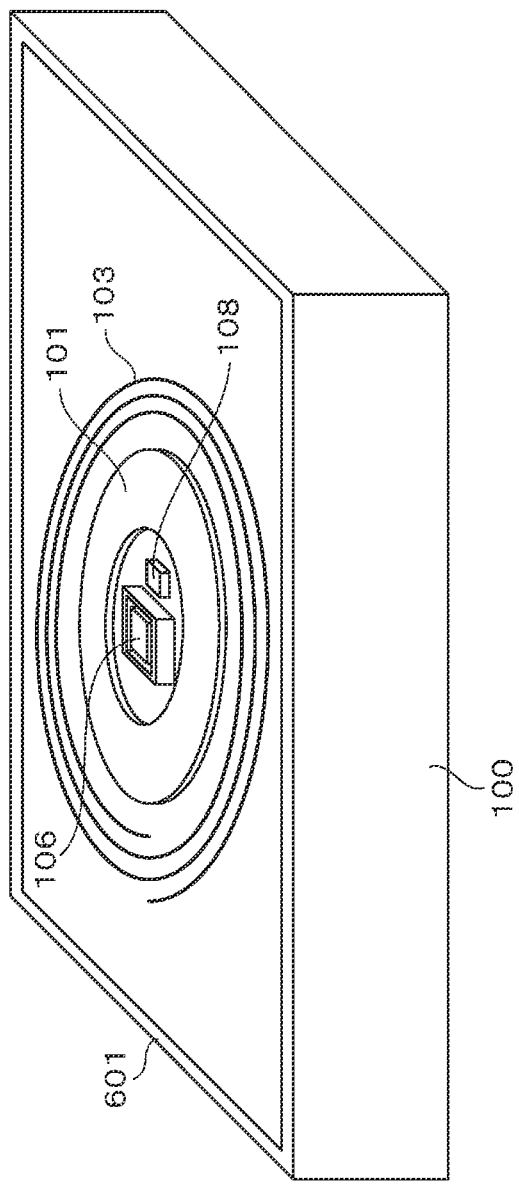
FIG. 7A is a bird's-eye view showing another configuration example of the power transmission unit of the power transmission device.

FIG. 7A is a bird's-eye view showing another configuration example of the power transmission unit of the power transmission device. Only one power transmission side magnet 106 is provided at the center of the upper surface, and a donut-shaped power transmission antenna 101 and a power transmission coil 103 are arranged around the power transmission side magnet 106. The magnetic sensor 108 is arranged at a position next to the power transmission side magnet 106. The components of the facing power reception device are also arranged at positions corresponding to the respective components of the power transmission device in FIG. 7A. By arranging the magnetic sensor 108 near the center in this manner, it is possible to reduce the detection error of the strength of the magnetic force and the misalignment of the antenna.

FIG. 7B is a cross-sectional view when the power transmission device and the power reception device are closely arranged in FIG. 7A. The magnetic force 701 is concentrated between the power transmission side magnet 106 and the power reception side magnet 206 to cause a closed state, so that these magnets are attracted to each other to enable accurate alignment. In addition, the power transmission antenna 101 and the power reception antenna 201 may be donut-shaped, but a flat plate-shaped antenna may be arranged on one side of the magnets 106 and 206. Even in this case, since the deviation in the rotational direction between the devices is regulated by the direction of the magnetic force 701 generated between the power transmission side magnet 106 and the power reception side magnet 206, accurate alignment is also possible for the flat plate-shaped power transmission antenna 101 and power reception antenna 201.

Second Embodiment

In a second embodiment, a pairing process between a power transmission device and a power reception device in a power supply system will be described. That is, by performing a pairing process between the power transmission device and the power reception device in advance and allowing a power supply operation only between the devices that have completed the pairing process, unnecessary power supply from the power transmission device to the power reception device that has not been paired with the power transmission device is prevented.

Figure 8:
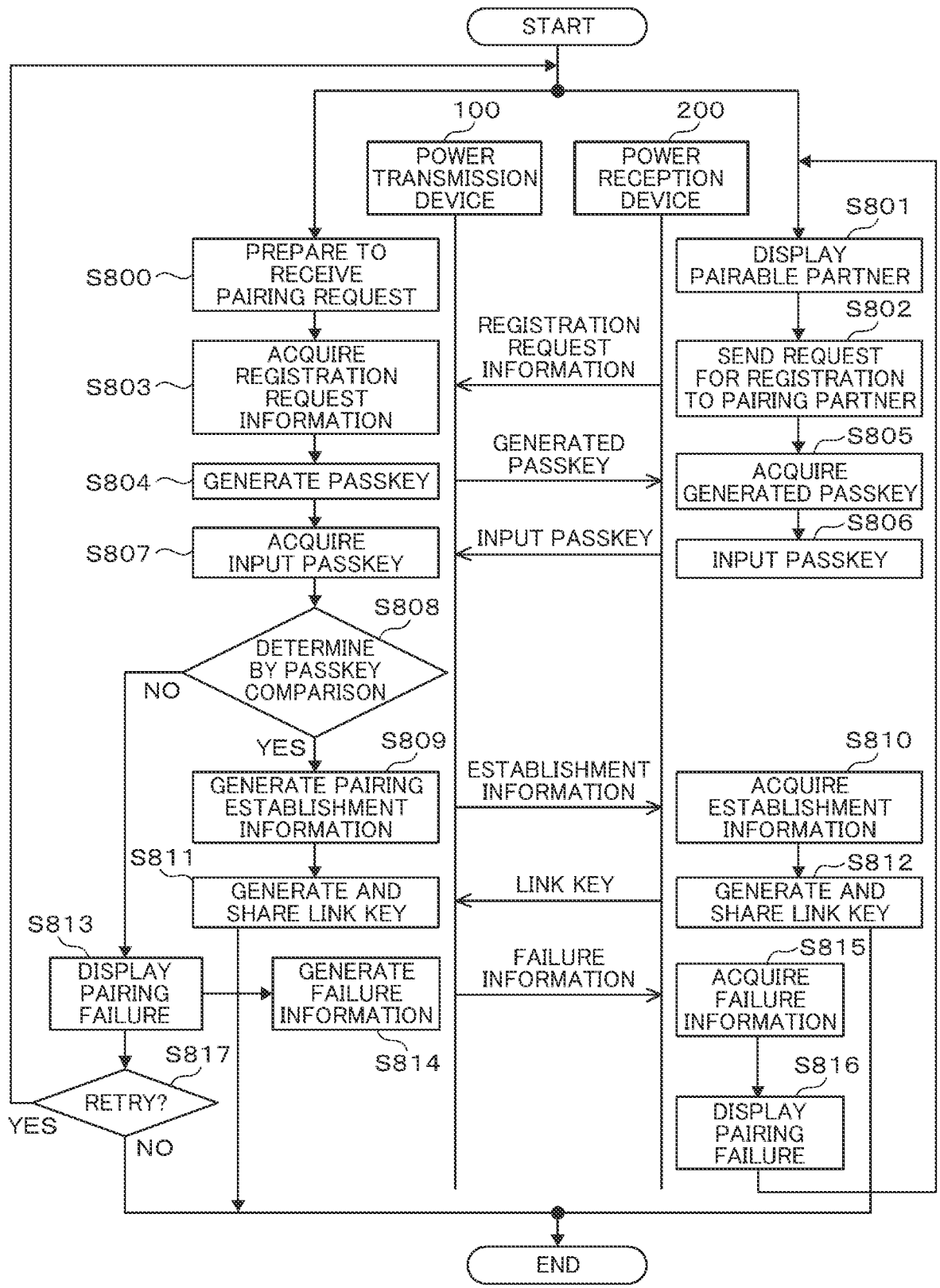
FIG. 8 is a flowchart showing a pairing process between a power transmission device and a power reception device (second embodiment).

FIG. 8 is a flowchart showing a pairing process between a power transmission device and a power reception device. The power transmission device and the power reception device perform a pairing process with each other before starting the wireless power supply process. In the pairing process, each other's information is shared with each other and encryption is established using the same encryption key to share the encryption key while ensuring security. Hereinafter, the procedure will be described.

Upon receiving an instruction to start a pairing process from the user, first, the power transmission device 100 sets a state in which a registration request from the pairing partner (power reception device) has been received by operating the operation input unit 112 (S800). On the other hand, the power reception device 200 displays a pairable partner (power transmission device) (S801), and sends a request for registration to the desired pairing partner by operating the operation input unit 212. Therefore, registration request information is generated, and the generated registration request information is transmitted to the power transmission device 100 through the wireless communication unit 215 (S802). The power transmission device 100 receives and acquires the registration request information from the power reception device 200 by using the wireless communication unit 115 (S803).

The power transmission device 100 generates a passkey, which is a randomly encrypted authentication key, according to the acquired registration request information, and transmits the generated passkey to the power reception device 200 by using the wireless communication unit 115 (S804). The power reception device 200 receives and acquires the generated passkey generated by the power transmission device 100 by using the wireless communication unit 215 (S805). In addition, the user may directly check and acquire the generated passkey displayed on the power transmission device 100. The power reception device 200 receives the acquired generated passkey from the operation input unit 212, and transmits the received passkey (input passkey) to the power transmission device 100 (S806). The power transmission device 100 receives and acquires the input passkey (S807).

Then, the power transmission device 100 compares the received input passkey with the generated passkey to determine match or mismatch (S808). When the received input passkey and the generated passkey match as a result of the determination (S808, Yes), the establishment of pairing is displayed on the display unit 113 to provide notification, and pairing establishment information indicating that the pairing has been established is generated. Then, the generated pairing establishment information is transmitted to the power reception device 200 through the wireless communication unit 115 (S809).

When the power reception device 200 acquires the pairing establishment information by using the wireless communication unit 215, the establishment of pairing is displayed on the display unit 213, or the user is notified of the establishment of pairing by the sound input and output unit 216 or the vibrator 217 (S810).

With the establishment of pairing, both the power transmission device 100 and the power reception device 200 generate a unique link key based on the passkey and share the unique link key with each other, and store link key information (S811, S812). Thereafter, by using the link key that is shared and stored, if the power transmission device and the power reception device are within the communicable range, it is possible to recognize each other's pairing partners.

On the other hand, when the received input passkey and the generated passkey do not match in the determination of S808 (S808, No), the pairing fails. The power transmission device 100 displays and notifies of the pairing failure (S813), generates pairing failure information and transmits the pairing failure information to the power reception device 200 (S814). When the power reception device 200 receives the pairing failure information (S815), the user is notified of the pairing failure by the display unit 213 or by the sound input and output unit 216 or the vibrator 217 (S816). Then, the process return to S801. The power transmission device 100 determines an instruction as to whether or not to retry the pairing process, and returns to the start of the pairing process or ends the pairing process (S817).

When the pairing is established between the power transmission device and the power reception device by the above pairing process and the power transmission device and the power reception device are within the communicable range, it is allowed to start the wireless power supply process described in the first embodiment. On the other hand, it is prohibited to start the wireless power supply process between the devices for which pairing has not been established. That is, the power transmission device determines whether or not the power reception device is a device, which is recognized in advance as a power supply target from the power transmission device, through the wireless communication unit, and supplies power only when the device is recognized in advance as a power reception target.

According to the second embodiment, since the power transmission device can wirelessly supply power only to the power reception device that has been paired with the power transmission device, it is possible to avoid wireless power supply to the power reception device that has not been paired with the power transmission device. As a result, not only can unnecessary power supply be prevented, but also a user-friendly power supply system can be realized by notifying the user of the success or failure of the pairing establishment.

In addition, although an example of the pairing process is shown in FIG. 8, it is needless to say that the same operation and effect can be obtained even if the pairing process is performed by another method.

Third Embodiment

In a third embodiment, the control of a power supply operation using the wearing detection unit 219 will be described. The wearing detection unit 219 of the power reception device 200 determines whether or not a smart watch, which is the power reception device 200, is worn on the user's body (wrist) based on the detection signal of the human body sensor 218 (a heart rate sensor, a blood pressure sensor, a body temperature sensor, and the like). Then, the power reception device 200 transmits the wearing detection signal from the wearing detection unit 219 to the power transmission device 100 through the wireless communication unit 215, and the control unit 110 of the power transmission device 100 controls the power transmission unit 105 according to the wearing detection signal received through the wireless communication unit 115.

For example, the state of FIG. 4 is a state in which the power reception device 200 (smart watch) is worn on the wrist. In this case, even if the distance between the power transmission device 100 and the power reception device 200 is a close arrangement state, power is not supplied by the coil method (electromagnetic induction method or magnetic resonance method), but switching to the antenna method (radio wave reception method) capable of supplying power in a short distance is performed. In this case, since the wrist is normally in motion, the smart watch worn on the wrist is in close contact with the power transmission device for a very short time or rarely. Therefore, even if the power supply method is switched between the coil method and the antenna method, the degree of improvement in the power supply time is extremely small. On the other hand, by using only the antenna method, frequent switching operations can be avoided and wireless power supply can be performed more stably. Undoubtedly, when the smart watch is not worn, the power supply method is switched according to the inter-device distance as described in the first embodiment.

According to the third embodiment, when the power reception device is worn on the user's body, wireless power supply can be performed more stably by fixing the power supply method to the antenna method.

In the above description of each embodiment, the case of a mobile battery as a power transmission device is taken as an example. However, it is apparent that the same operation and effect can be obtained even with a mobile information terminal such as a smartphone having a built-in battery as a power reception device. That is, when wirelessly supplying power from the built-in battery of the power transmission device to the built-in battery of the power reception device, the effect of suppressing a decrease in power supply efficiency and eliminating the waste of transmitted power can be obtained by controlling the power supply operation according to the inter-device distance.

In addition, the present invention is not limited to the embodiments described above, and includes various modification examples. For example, the above embodiments have been described in detail for easy understanding of the present invention, but the present invention is not necessarily limited to having all the components described above. In addition, some of the components in one embodiment can be replaced with the components in another embodiment, and the components in another embodiment can be added to the components in one embodiment. In addition, for some of the components in each embodiment, addition, removal, and replacement of other components are possible.

In addition, each of the above-described components, functions, processing units, processing means, and the like may be realized by hardware, for example, by designing some or all of these with an integrated circuit or the like. In addition, each of the above-described components, functions, and the like may be realized by software by the processor interpreting and executing a program for realizing each function. Information such as a program, a table, and a file for realizing each function can be placed in a memory, a recording device such as a hard disk or an SSD (Solid State Drive), or a recording medium such as an IC card, an SD card, or a DVD.

In addition, the control lines or the information lines are those considered to be necessary for the description, and all control lines or information lines on the product are not necessarily shown. In practice, it may be considered that almost all components are interconnected.

REFERENCE SIGNS LIST

1 Power supply system
100 Power transmission device
101 Power transmission antenna
102 Power-to-radio wave conversion unit
103 Power transmission coil
104 Power-to-current conversion unit
105 Power transmission unit
106, 107 Power transmission side magnet
108 Magnetic sensor
109 Optical sensor
110, 210 Control unit
113, 213 Display unit
115, 215 Wireless communication unit
130, 230 Switch
131, 232 Battery
200 Power reception device
201 Power reception antenna
202 Radio wave power reproduction unit
203 Power reception coil
204 Coil power reproduction unit
205 Power reception unit
206, 207 Power reception side magnet
209 Light emitting element
216 Sound input and output unit
217 Vibrator
218 Human body sensor
219 Wearing detection unit
601, 602, 603 Ferromagnet

The invention claimed is:
1. A power supply system for wirelessly supplying power between a power transmission device and a power reception device,
   wherein the power transmission device includes:
      a power transmitter for generating supply power and transmitting the generated supply power to the power reception device;
      a power transmission side magnet for alignment with the power reception device;
      a magnetic sensor for detecting a magnetic force from a power reception side magnet provided in the power reception device; and
      a controller for controlling the power transmission device,
   the power reception device includes:
      a power receiver for receiving the supply power supplied from the power transmission device;
      the power reception side magnet for alignment with the power transmission device; and
      a controller for controlling the power reception device,
   the power transmission device and the power reception device include wireless communication units for wirelessly communicating with each other, the power transmitter of the power transmission device is able to perform switching between an antenna power transmission method using a power-to-radio wave convertor for converting power into radio waves and a power transmission antenna for radiating the converted radio waves to outside and a coil power transmission method using a power-to-current convertor for converting power into an alternating current and a power transmission coil through which the converted alternating current flows, the power receiver of the power reception device is able to perform switching between an antenna power reception method using a power reception antenna for receiving radio waves and a radio wave power reproduction circuit for reproducing power from the received radio waves and a coil power reception method using a power reception coil, in which an alternating current is induced by electromagnetic induction or magnetic resonance, and a coil power reproduction circuit for reproducing power from the induced current, the controller of the power reception device acquires information of a power transmission method switched by the power transmitter through the wireless communication unit, and controls the power receiver to perform switching to a power reception method corresponding to the power transmission method of the power transmitter to receive power, when the power transmission device and the power reception device are in close contact with each other, power is wirelessly transmitted from the power transmitter to the power receiver in a state in which the power transmitter and the power receiver are aligned by an attractive magnetic force between the power transmission side magnet and the power reception side magnet, and when the power transmission device and the power reception device are apart from each other, the controller of the power transmission device starts or stops power transmission from the power transmission unit according to a magnetic force detection signal from the power reception side magnet detected by the magnetic sensor.

2. The power supply system according to claim 1,
wherein the power reception device includes a light emitting element that emits light to outside,
the power transmission device includes an optical sensor that detects light from the light emitting element provided in the power reception device,
the controller of the power transmission device determines a state of alignment between the power transmitter and the power receiver based on a detection signal of the optical sensor, and
when the power transmitter and the power receiver are not aligned, it is determined that the power transmission device and the power reception device are apart from each other.

3. The power supply system according to claim 1,
wherein the controller of the power transmission device controls the power transmission unit to transmit power using the coil power transmission method when the power transmission device and the power reception device are in close contact with each other, transmit power using the antenna power transmission method when the power transmission device and the power reception device are apart from each other and a magnetic force detection signal m of the magnetic sensor is equal to or higher than a predetermined level m2, and stop power transmission when the power transmission device and the power reception device are apart from each other and the magnetic force detection signal m of the magnetic sensor is less than the predetermined level m2.

4. The power supply system according to claim 3,
wherein the controller of the power transmission device further controls the power transmitter to transmit power using the coil power transmission method when the power transmission device and the power reception device are apart from each other and the magnetic force detection signal m of the magnetic sensor is equal to or higher than a predetermined level m1 (m1>m2).

5. The power supply system according to claim 1,
wherein the power transmission device includes an operation input interface for inputting a user's operation, and
the controller of the power transmission device controls the power transmitter to perform switching to the coil power transmission method or the antenna power transmission method according to a user's selection input to the operation input interface to transmit power when the power transmission device and the power reception device are in close contact with each other, transmit power using the antenna power transmission method when the power transmission device and the power reception device are apart from each other and a magnetic force detection signal m of the magnetic sensor is equal to or higher than a predetermined level m2, and stop power transmission when the power transmission device and the power reception device are apart from each other and the magnetic force detection signal m of the magnetic sensor is less than the predetermined level m2.

6. The power supply system according to claim 1,
wherein, in the power transmission device, a ferromagnet for magnetically shielding a magnetic force from the power transmission side magnet to the magnetic sensor is provided around the power transmission side magnet.

7. The power supply system according to claim 6,
wherein, in the power transmission device, a ferromagnet for magnetically shielding a magnetic force from a direction other than a direction detected by the magnetic sensor is further provided.

8. The power supply system according to claim 1,
wherein the power transmission device and the power reception device include wireless communication interfaces for wirelessly communicating with each other,
the power transmission device and the power reception device execute a pairing process through the wireless communication interfaces in advance in order to indicate that the power reception device is a device as a power reception target, and
the controller of the power transmission device determines whether or not the power reception device to which power is to be transmitted has completed the pairing process through the wireless communication interface, and controls the power transmitter to transmit power only when the power reception device is a device that has completed the pairing process.

9. The power supply system according to claim 1,
wherein the power reception device includes a wearing condition detector for detecting that the power reception device is worn by a user,
the power reception device transmits a wearing detection signal from the wearing detection unit to the power transmission device through the wireless communication interface, and when the wearing detection signal is received from the power reception device, the controller of the power transmission device controls the power transmitter to transmit power using the antenna power transmission method.

* * * * *